United States Patent
McIntyre

(10) Patent No.: US 6,576,915 B1
(45) Date of Patent: Jun. 10, 2003

(54) METHOD AND SYSTEM FOR ELECTRONIC PASTEURIZATION

(76) Inventor: Peter M. McIntyre, 611 Montclair, College Station, TX (US) 77840

( * ) Notice: Subject to any disclaimer, the term of this patent is extended or adjusted under 35 U.S.C. 154(b) by 0 days.

(21) Appl. No.: 09/248,675

(22) Filed: Feb. 11, 1999

Related U.S. Application Data

(60) Provisional application No. 60/074,540, filed on Feb. 12, 1998.

(51) Int. Cl.[7] .............................................. H01J 37/147
(52) U.S. Cl. ................................................ 250/492.3
(58) Field of Search .......................... 250/492.3, 515.1, 250/396 ML

(56) References Cited

U.S. PATENT DOCUMENTS

| | | | | |
|---|---|---|---|---|
| 3,617,740 A | * | 11/1971 | Skillicorn | ................... 250/49.5 |
| 4,492,873 A | | 1/1985 | Dmitriev et al. | ......... 250/492.3 |
| 4,771,179 A | * | 9/1988 | Ijiri et al. | |
| 4,795,654 A | | 1/1989 | Teleki | ........................ 428/635 |
| 4,980,564 A | * | 12/1990 | Steelmon | |
| 5,004,926 A | | 4/1991 | Vassenaix et al. | ....... 250/492.3 |
| 5,140,710 A | * | 8/1992 | Rademacher | |
| 5,324,952 A | * | 6/1994 | Cummings | |
| 5,349,198 A | | 9/1994 | Takanaka | ................... 250/492.3 |
| 5,382,802 A | * | 1/1995 | Anabuki et al. | ......... 250/492.1 |
| 5,451,790 A | * | 9/1995 | Enge | .......................... 250/436 |
| 5,483,122 A | | 1/1996 | Derbenev et al. | .......... 315/5.14 |
| 5,583,318 A | * | 12/1996 | Powell | |
| 5,700,626 A | * | 12/1997 | Lee et al. | |
| 5,909,032 A | * | 6/1999 | Wakalopulos | |
| 5,981,963 A | * | 11/1999 | Kampmeier | |
| 6,110,318 A | * | 8/2000 | Goodman | |
| 6,140,657 A | * | 10/2000 | Wakalopulos et al. | |
| 6,188,075 B1 | * | 2/2001 | Takayama et al. | ....... 250/492.3 |
| 6,191,424 B1 | * | 2/2001 | Stirling et al. | ......... 250/455.11 |

FOREIGN PATENT DOCUMENTS

| | | |
|---|---|---|
| GB | 1282122 | 7/1972 |
| WO | WO 95/09544 | 4/1995 |
| WO | WO 98/29895 | 7/1998 |

* cited by examiner

*Primary Examiner*—Kiet T. Nguyen
(74) *Attorney, Agent, or Firm*—Raymond M. Galasso; Simon, Galasso & Frantz PLC

(57) ABSTRACT

A method and system for electronic pasteurization using an electron beam is provided. The electronic pasteurization system (20) may comprise a module accelerator (22*a*), a module electron beam transport system (24*a*), and at least one treatment station (26). The module accelerator (22) produces a plurality of independent electron beams (28). The module electron beam transport system (24*a*) communicates the electron beams (28) to the treatment stations (26). A target (30) is irradiated with the electron beam (28) within the treatment station (26).

24 Claims, 14 Drawing Sheets

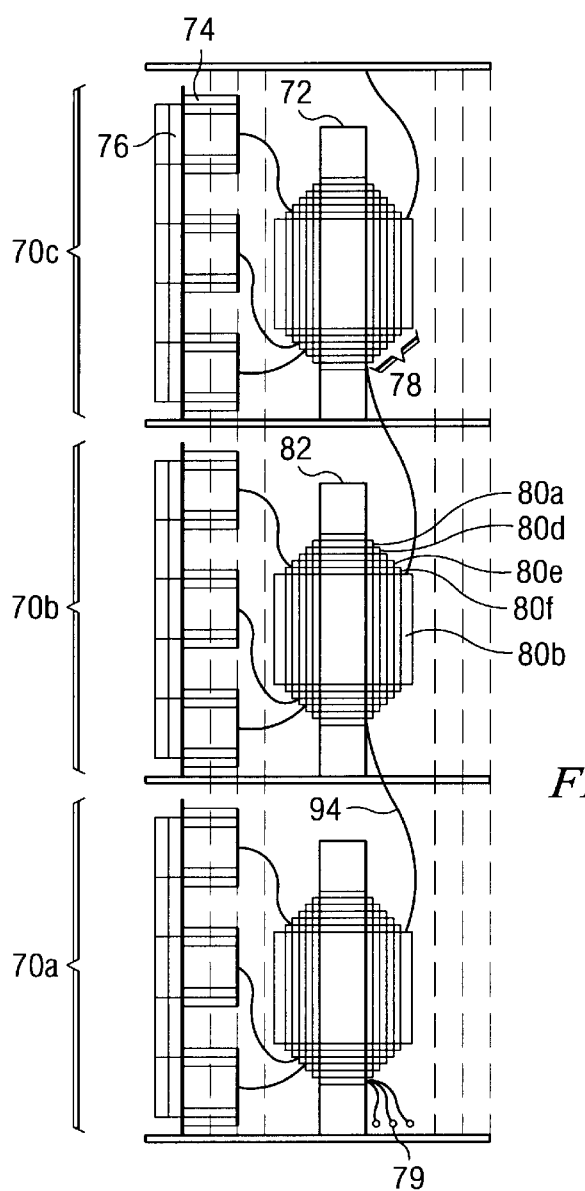
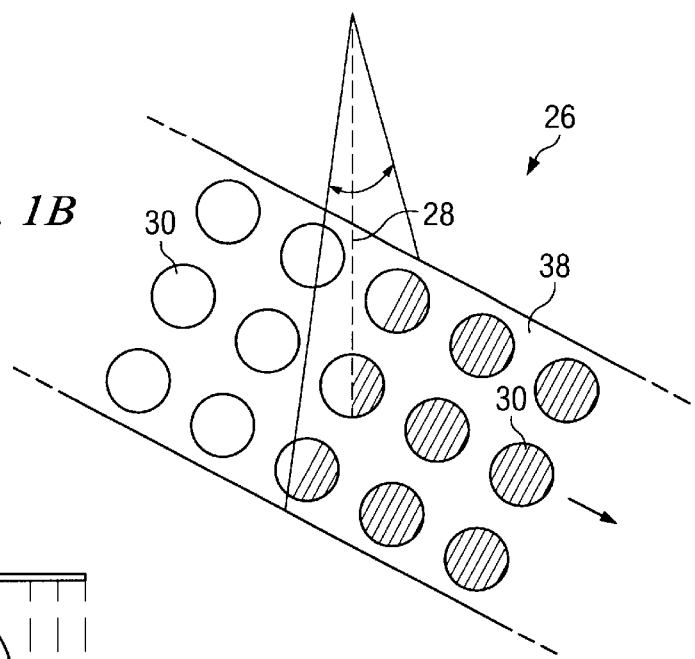
FIG. 1B
FIG. 2B

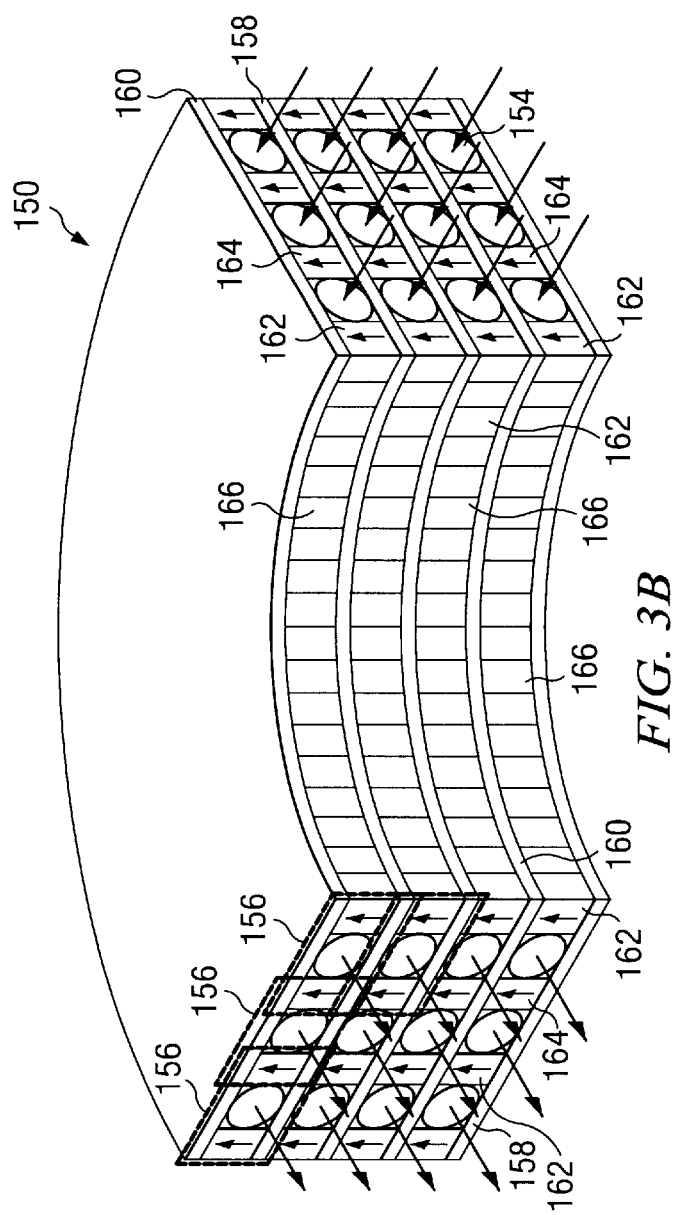
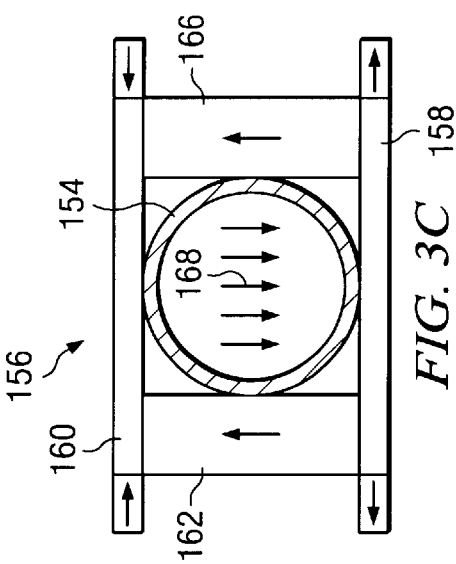
FIG. 3B
FIG. 3C

METHOD AND SYSTEM FOR ELECTRONIC PASTEURIZATION

CROSS-REFERENCE TO RELATED APPLICATIONS

This application claims priority under 35 U.S.C. §119(e) to provisional application No. 60/074,540, filed Feb. 12, 1998.

TECHNICAL FIELD OF THE INVENTION

This invention relates generally to the field of irradiation systems, and more particularly to a method and system for electronic pasteurization.

BACKGROUND OF THE INVENTION

Irradiation involves exposing a target to an ionizing radiation to change the microbiology of the target. Irradiation is an effective method for killing micro organisms and insects in foods, extending the shelf life of various foods, and sterilizing medical products. Irradiation is particularly suited for treating food, such as meat, to kill food-borne pathogens, such as *E. Coli*, Trichinosis, Salmonella, Yersinia, Campylobacter, Shigella, and the like. Two characteristics determine the effectiveness of an irradiation treatment—the dose, which is the total beam energy delivered per mass of food; and the penetration depth, which is the maximum depth into the food to which the dose is delivered. The penetration depth is a property of the ionizing radiation that is used for irradiation. Food irradiation typically requires a dose of about 300,000 rads to achieve a statistical kill of the pathogenic bacteria.

Conventional irradiation systems utilize one of three methods to produce the ionizing radiation. γ-ray irradiation systems produce γ-rays from radioactive sources, typically $Co^{60}$. X-ray irradiation systems produce X-rays by targeting an electron beam, on the order of 5 MeV, on a metal target which produces X-rays. Conventional electron beam irradiation systems produce a high-energy electron beam, typically on the order of 10 MeV energy, and deliver it directly into the food. The γ-ray irradiation systems and X-ray irradiation systems deliver a deep penetration, on the order of 30 centimeters into food, but require immense shielding assemblies, on the order of 3 meters thick of concrete, for safe operation. Conventional electron beam irradiation systems deliver less penetration, on the order of 7 centimeters in food, but require somewhat less shielding, on the order of 2 meters of concrete.

Conventional electron beam irradiation systems generally include an accelerator, a beam transport system, and a treatment station. Specifically, the accelerator produces an electron beam which is communicated to the treatment station by the beam transport system. Within the treatment station, the electron beam is scanned to deliver a uniform dose as the target passes through the treatment station. The higher the energy of the electron beam, the greater the depth that the electron beam can penetrate the target and deliver the required dose of ionizing radiation.

Conventional electron beam irradiation systems have many disadvantages. For example, conventional electron beam irradiation systems are inefficient, in that the electron beam scans across a specific area within the treatment station, but in many applications, the target covers only a fraction of the scanned area. The utilization efficiency, defined as the fraction of electron beam actually delivered to target, is typically less than 30% in conventional electron beam irradiation systems.

As will be discussed below, conventional electron beam irradiation systems are extremely expensive due to the technical disadvantages of conventional accelerators, beam transport systems, and treatment stations. Conventional electron beam irradiation systems often utilize a radiofrequency linear accelerator (LINACS) to produce an electron beam. LINACS operate by producing a high-intensity electric field within a series of cylindrically symmetric resonant cavity. The electron beam is passed along the axis of the cavities, where it is both accelerated to increase its energy and focussed to confine the beam transversely. A technical disadvantage of LINACS is that only a single electron beam can be produced, because the beam must pass along the axis of the cavities. For food irradiation applications, a typical food processing operation has multiple parallel processing lines, and thus requires multiple parallel treatment stations for irradiation. Since each conventional electron beam irradiation system can produce only one beam, the expense of multiple stations would be extremely high.

Another technical disadvantage of conventional accelerators is that they are expensive to build and do not operate efficiently. Conventional high energy accelerators typically cost on the order of $5,000,000 to $7,000,000, and operate at only 30–70 percent efficiency.

Conventional beam transport systems generally utilize electromagnets to transport the electron beam from the accelerator to the treatment station. The electromagnets generate a magnetic field based on the pattern of electrical currents that flow through the electromagnet. Conventional beam transport systems generally use dipole and quadrupole electromagnets. The dipole electromagnet produces a uniform magnetic field in the region traversed by the beam and thereby bends the electron beam on a constant radius of curvature. The quadrupole electromagnet produces a distribution of magnetic field that increases linearly with distance from the beam axis, and focuses the beam to confine it along the direction of transport. A technical disadvantage of conventional beam transport systems is that the electromagnets require an active electrical power system along the entire length of the beam transport system. The electrical power system adds complexity and cost to conventional beam transport systems, particularly in food irradiation applications where it may be advantageous to locate the accelerator in one location and deliver beams to multiple treatment stations at locations distributed throughout a large facility.

Conventional treatment stations include electro-optics that scan the electron beam transversely to illuminate the scan area, as well as shielding to prevent harmful levels of radiation from escaping the treatment station. Conventional electro-optics direct the electron beam to the outer surfaces of the target. A technical disadvantage of conventional electro-optics is that the internal cavities cannot readily be irradiated with the electron beam unless the beam energy is sufficiently high to penetrate the entire thickness of the target. High energy electron beams necessitate the use of heavy shielding to protect operating personnel.

Conventional irradiation systems must be housed in a structure that shields the intense ionizing radiation so that the system can be operated safely in a food processing plant. Regulatory agencies generally require the dose of ionizing radiation to be reduced to a level commensurate with the radiation dose a person would naturally receive from cosmic rays and natural radioactivity, which is less than 0.0001 rads per year. In order to reduce the dose of ionizing radiation to acceptable levels, the thickness of the shielding in conventional irradiation systems typically exceeds three meters, and is often on the order of 5 meters. In addition, the shielding must include a labyrinth having a similar thickness through which the target is transported in an out of the treatment station. A typical conventional irradiation system occupies an area of about 200 m$^2$, which makes it difficult to integrate into the existing process lines of a food processing plant.

The technical disadvantage of heavy shielding is that the treatment station often becomes a separate shielded facility that cannot be integrated into large in-line food processing applications. Another technical disadvantage is that the separate shielded facility creates a processing bottleneck, in that all targets must pass through this one facility. Furthermore, the capital costs associated with constructing the shielded facility often exceed the cost of the accelerator.

As a result of the construction costs and operating expenses, as well as the safety issues associated with conventional irradiation systems, conventional irradiation systems have not generally been commercially implemented in large scale food treatment applications.

SUMMARY OF THE INVENTION

Accordingly, a need has arisen for an improved irradiation system. The present invention provides a method and system for electronic pasteurization that substantially reduces or eliminates problems associated with prior systems and methods.

In accordance with one embodiment of the present invention, an electronic pasteurization system is provided. In accordance with one embodiment of the present invention, a modular accelerator is provided. In another embodiment of the present invention, a modular beam transport system is provided. In yet another embodiment of the present invention, a labyrinth treatment station is provided. In a further embodiment of the present invention, a multilayer shielding system is provided.

In one embodiment of the electronic pasteurization system, the electronic pasteurization system comprises a modular accelerator, at least one treatment station, and a modular beam transport system. In another embodiment, the electronic pasteurization system comprises a modular accelerator, at least one treatment station, and a beam transport system. In another embodiment, the electronic pasteurization system, includes a modulation control system. In yet another embodiment, the electronic pasteurization system comprises an accelerator, a treatment station that includes a multilayer shielding system, and a beam transport system. In a further embodiment, the electronic pasteurization system comprises an accelerator, at least one treatment station, and a modular beam transport system.

In one embodiment of the modular accelerator, the modular accelerator can produce a plurality of electron beams. In another embodiment of the modular accelerator, the modular accelerator comprises a plurality of power assemblies, wherein each power assembly supplies an isolated power to the next successive power assembly. In yet another embodiment of the modular accelerator, each electron beam produced by the modular accelerator can be individually modulated. In another embodiment, the modular accelerator includes a dry dome. In yet another embodiment, the modular accelerator includes an accelerator column having a casing.

In one embodiment of the treatment station, the treatment station includes a multilayer shielding system. In another embodiment, the treatment station comprises a labyrinth structure. In another embodiment, the treatment station includes a stub probe. In another embodiment, the treatment station continuously processes patties. In yet another embodiment, the treatment station continuously processes a thin sheet target.

In one embodiment of the modular beam transport system, the modular beam transport system comprises a bending block. In another embodiment, the modular beam transport system comprises a focusing block. In a further embodiment, the modular beam transport system comprises permanent magnets.

The electronic pasteurization system provides many technical advantages. For example, multiple treatment stations can be operated simultaneously from a single modular accelerator. Accordingly, the cost of the electronic pasteurization system is significantly reduced and it is easier to integrate the electronic pasteurization system into large scale food operations.

Another technical advantage of the electronic pasteurization system is that each electron beam can be independently modulated to only expose the target the electron beam. Accordingly, the operational efficiency of the electronic pasteurization system is increased. In addition, modulation reduces the level of shielding required in the treatment station. Accordingly, the treatment station is significantly smaller, and can be easily integrated into existing food processing facilities.

A technical advantage of the modular accelerator is that the power of the modular accelerator can be scaled to suit the particular application without incurring significant design costs. Another advantage of the modular accelerator is that the modular accelerator can produce multiple independent electron beams. Accordingly, a single modular accelerator can support multiple treatment stations simultaneously.

A technical advantage of the modular beam transport system is that a power system is not required. In addition, the modular beam transport system is easy to construct, and requires minimal maintenance. Another advantage of the modular beam transport system is that multiple electron beams can be transported simultaneously.

A technical advantage of the treatment station is the multilayer shielding system. The multilayer shielding system provides the same amount of radiation protection as conventional shielding that is significantly thicker. Accordingly, the size of the treatment station is much smaller than conventional treatment stations.

Another technical advantage of the treatment station is the labyrinth structure. The labyrinth structure allows continuous processing of the targets through the treatment station. Accordingly, treatment stations can support large scale food production operations.

Other technical advantages will be readily apparent to one skilled in the art from the following figures, descriptions, and claims.

BRIEF DESCRIPTION OF THE DRAWINGS

For a more complete understanding of the present invention and the advantages thereof, reference is now made to the following description taken in conjunction with the accompanying drawings, wherein like referenced numerals represent like parts, in which:

FIG. 1B is a schematic drawing illustrating the operation of a modulation control system in accordance with the present invention;

FIGS. 2B and 2C are rotated schematic side view drawings illustrating a power system as shown in FIG. 2A in accordance with the present invention;

FIG. 3B is a perspective drawing illustrating a bending module as shown in FIG. 3A in accordance with the present invention;

FIG. 3C is a cross sectional drawing illustrating a bending block as shown in FIG. 3B in accordance with the present invention;

DETAILED DESCRIPTION OF THE INVENTION

FIGS. 1A through 7B illustrate various aspects of an electronic pasteurization system. The electronic pasteurization system comprises an improved accelerator, an improved beam transport system, and improved treatment stations for electron beam irradiation of a target. As described in greater detail below, the electronic pasteurization system and each individual component of the electronic pasteurization system include various distinct inventive aspects that are improvements over conventional electron beam irradiation systems. For example, the construction costs associated with the electronic pasteurization system are much less expensive than conventional irradiation systems. In addition, the electronic pasteurization system may employ a modulation control system to modulate the electron beam such that an electron beam is produced only when a target is to be irradiated. The improved accelerator is less expensive than conventional accelerators and operates at greater than 95% efficiency. In addition, the improved accelerator can deliver multiple independent electron beams, which allows multiple treatment stations to be operated from a single accelerator. The improved beam transport system utilizes permanent magnets that do not require an active control system. Specifically, once the beam transport system has been aligned, no additional work or control systems are necessary. In addition, the improved transport system can communicate multiple electron beams from the accelerator to multiple treatment stations which are distributed within a food processing facility. The improved treatment station utilizes a two-layer shielding system that substantially reduces the thickness of the shielding. In particular, the two-layer shielding system can reduce the thickness of the shielding by a factor of approximately 5. The improved treatment station may also utilize various labyrinth systems to contain the radiation. Specifically, treatment stations that effectively irradiate food patties and chubs are disclosed. In addition, an internal probe for irradiating the internal surfaces of a carcass, such as a chicken, is disclosed.

The various inventive aspects are illustrated in terms of an electronic pasteurization system used for electron beam irradiation of food products. It will be appreciated that the electronic pasteurization system may be otherwise suitably used without departing from the scope of the present invention. For example, the electronic pasteurization system may be used to sterilize medical supplies, as well as to sterilize insects for insect control programs. It will also be appreciated that the individual inventive aspects may be otherwise suitably used without departing from the scope of the present invention. For example, the accelerator includes several inventive aspects that can be beneficially implemented in other accelerators.

Figure 1A:
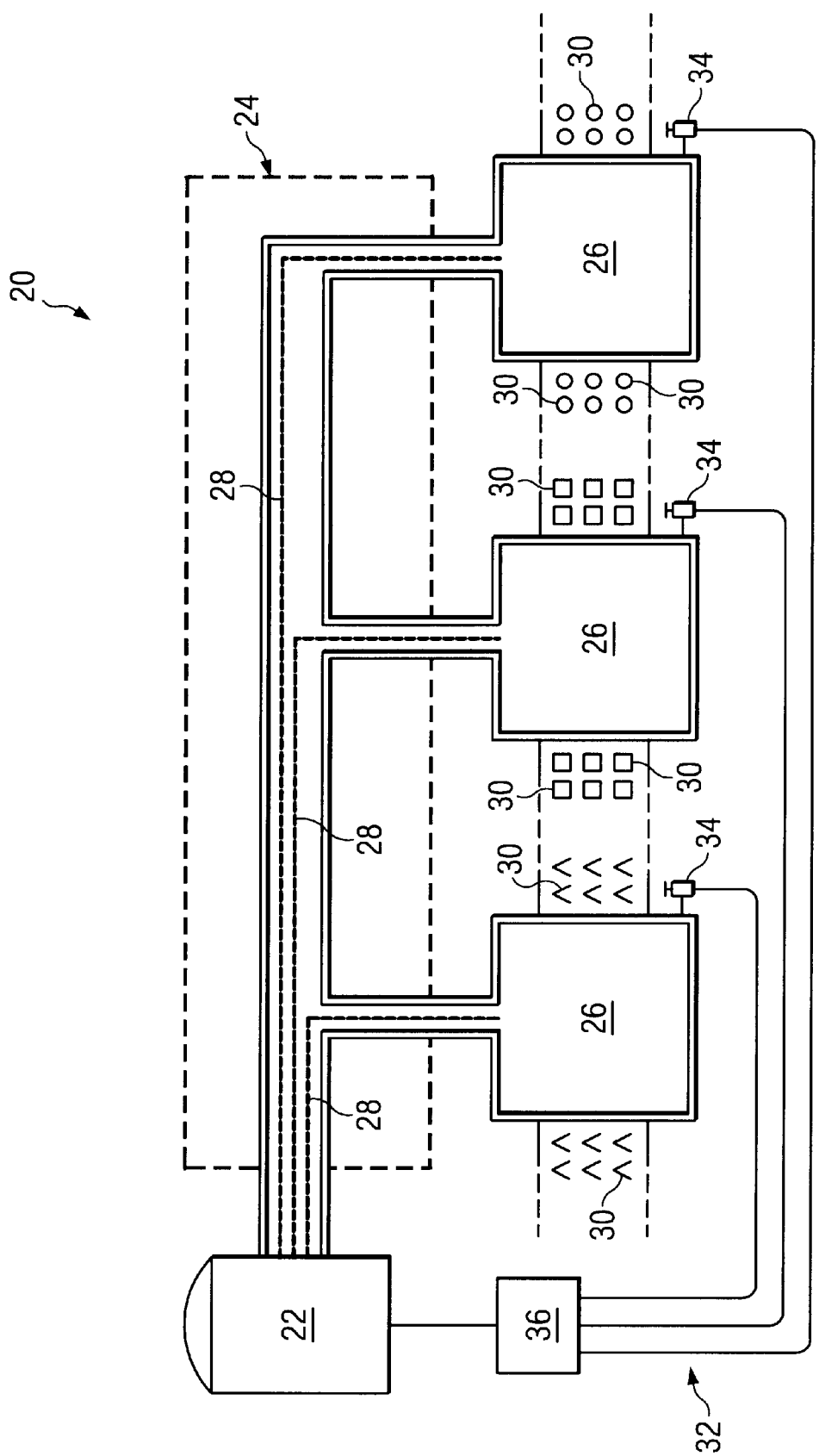
FIG. 1A is a schematic drawing illustrating an electronic pasteurization system in accordance with the present invention.

FIG. 1A is a schematic diagram illustrating one embodiment of an electronic pasteurization system 20. In this embodiment, the electronic pasteurization system 20 comprises an accelerator 22, a beam transport system 24, and at least one treatment station 26. The accelerator 22 produces at least one electron beam 28. The electron beam 28 is communicated by the beam transport system 24 to the treatment station 26. A target 30 travels through the treatment station 26 and is irradiated with the electron beam 28.

Irradiation is an effective means for killing bacterial pathogens and other micro organisms, insects, molds, and the like, as well as extending the shelf life of various foods, such as fruits and vegetables. Irradiation operates by delivering a specific dose of ionizing radiation, i.e., electrons, to the target 30. The dose of ionizing radiation is determined by the application. For example, a low dose of ionizing radiation may be used to sterilize insects for insect control programs; a midlevel dose of ionizing radiation may be used to extend the shelf life of various foods; and a high dose of ionizing radiation may be used to kill pathogens in meat products.

The preferred embodiment of the electronic pasteurization system 20 utilizes the electron beam 28 to irradiate multiple surfaces of the target 30. Irradiating multiple. surfaces of the target 30 reduces the depth that the electron beam 28 must penetrate the target 30 in order to deliver the appropriate dose of ionizing radiation. Accordingly, the energy level of the electron beam 28 is similarly reduced. Conventional electron beam irradiation systems generally produce an electron beam 28 having a high energy level that can achieve deep penetration, on the order of 30 centimeters, into the target 30. A high energy electron beam 28 requires a high energy and expensive accelerator, as well as a treatment station that requires extensive shielding to protect operating personnel from the high radiation levels. Reducing the required energy level by irradiating multiple surfaces of the target 30 minimizes the cost of the accelerator and the level of shielding required in the treatment station 26. Accordingly, an electronic pasteurization system 20 having treatment stations 26 that irradiate multiple surfaces of the target 30 is less expensive and minimizes the radiation risks to operating personnel, as compared to conventional electron beam irradiation systems.

The preferred embodiment of the accelerator 22 comprises a modular accelerator 22a, described below in FIGS. 2A–2F. The modular accelerator 22a may be configured to produce multiple independent electron beams 28. In particular, the modular accelerator 22a may produce ten or more independent electron beams 28. Each electron beam 28 can be communicated to a separate treatment station 26. In contrast, conventional accelerators produce only a single electron beam. Thus, conventional electron beam irradiation systems require a dedicated accelerator for each treatment station 26, which substantially increases the cost and size of conventional electron beam irradiation systems, as well as making it extremely difficult to integrate conventional electron beam irradiation systems into existing food processing operations. Accordingly, an electronic pasteurization system 20 utilizing the modular accelerator 22a is substantially less expensive and easier to integrate into existing food processing operations than conventional electron beam irradiation systems.

In addition, the modular accelerator 22a can easily be scaled to provide different electron beams 28 at different power levels. Different applications utilize electron beams 28 having different power levels. For example, medical irradiation applications generally require a threshold power level of 5 kW. Chicken irradiation applications generally require a threshold power level of 50 kW. The modular accelerator 22a easily accommodates the different power levels without substantially altering the existing components or needing expensive accelerator redesign efforts.

The preferred embodiment of the beam transport system 24 comprises a modular beam transport system 24a, described below in FIGS. 3A–3C. The modular beam transport system 24a communicates the electron beams 28 using permanent magnets. In particular, the modular beam transport system 24a utilizes dipole and multipole permanent magnets to communicate and focus the electron beam 28. Once properly aligned, the modular beam transport system 24a requires little maintenance. In addition, the modular beam transport system 24a is relatively easy to construct and can be installed in nearly any location, such as the roof of an existing facility. Conventional beam transport systems generally utilize electromagnets for communicating and focusing the electron beam 28. Electromagnetic beam transport systems require active control systems to continuously maintain control of the electron beam 28 by precisely controlling the electrical current through each electromagnet. As a result of the complexity and reliance on electrical systems, conventional beam transport systems are often prone to failure and are expensive to maintain. Accordingly, an electronic pasteurization system 20 utilizing the modular electron beam transport system 24a is less expensive to construct and maintain than conventional beam transport systems.

The preferred embodiment of the treatment station 26 includes a multilayer shielding system 200, described below in FIG. 4. The multilayer shielding system 200 is substantially thinner than conventional shielding for a given radiation shielding level. The reduced thickness of the multilayer shielding system 200 allows the treatment station 26 to be substantially smaller in size and cost less to construct than conventional treatment stations. As a result, treatment stations 26 incorporating the multilayer shielding system 200 can easily be integrated into in-line food processing operations. Accordingly, an electronic pasteurization system 20 having a treatment station 26 that includes the multilayer shielding system 200 is less expensive to construct and has reduced radiation safety hazards as compared to conventional electron beam irradiation systems.

Figure 2A:
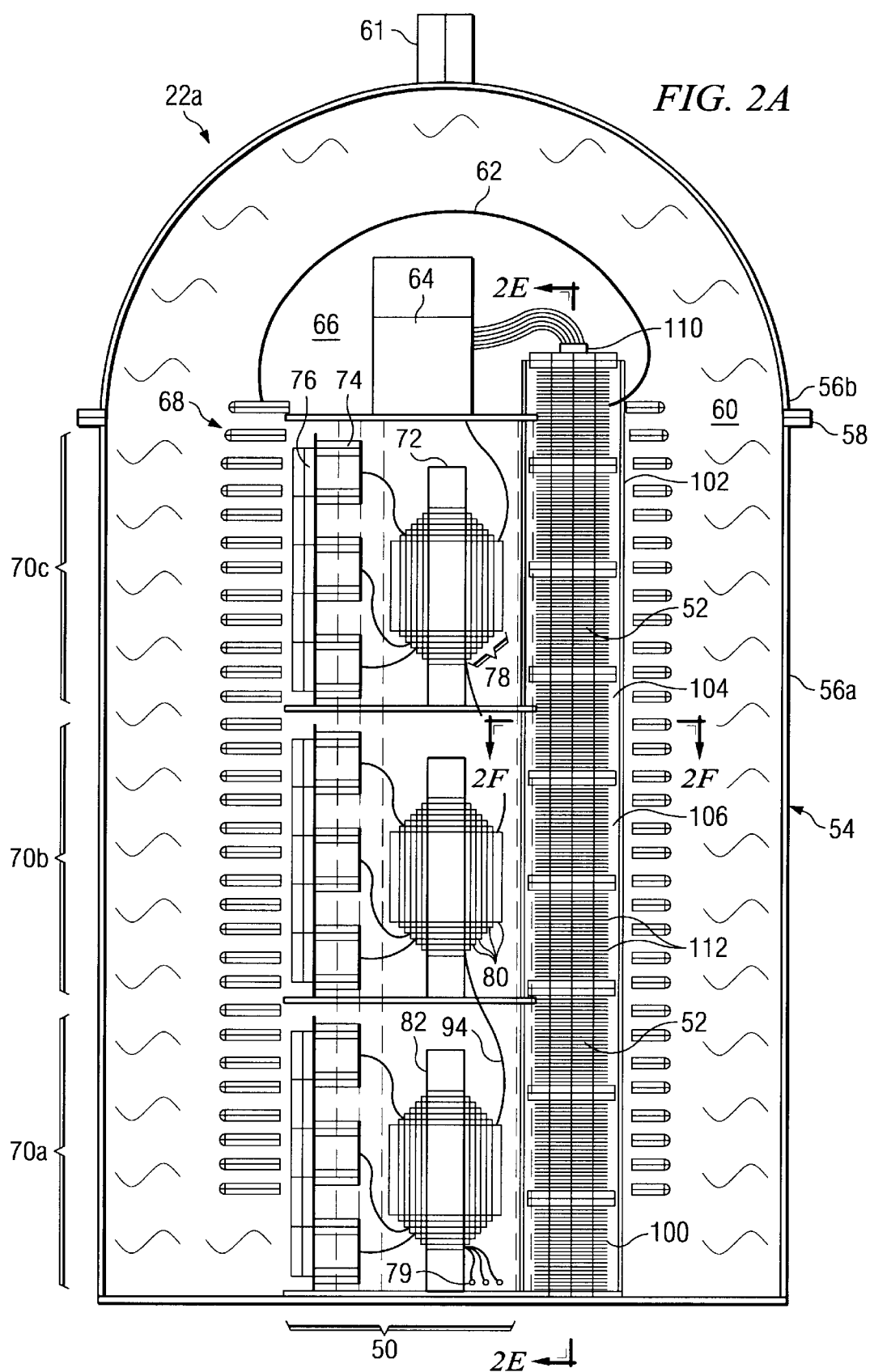
FIG. 2A is a schematic side view drawing with portions broken away illustrating a modular accelerator in accordance with the present invention.
Figure 2C:
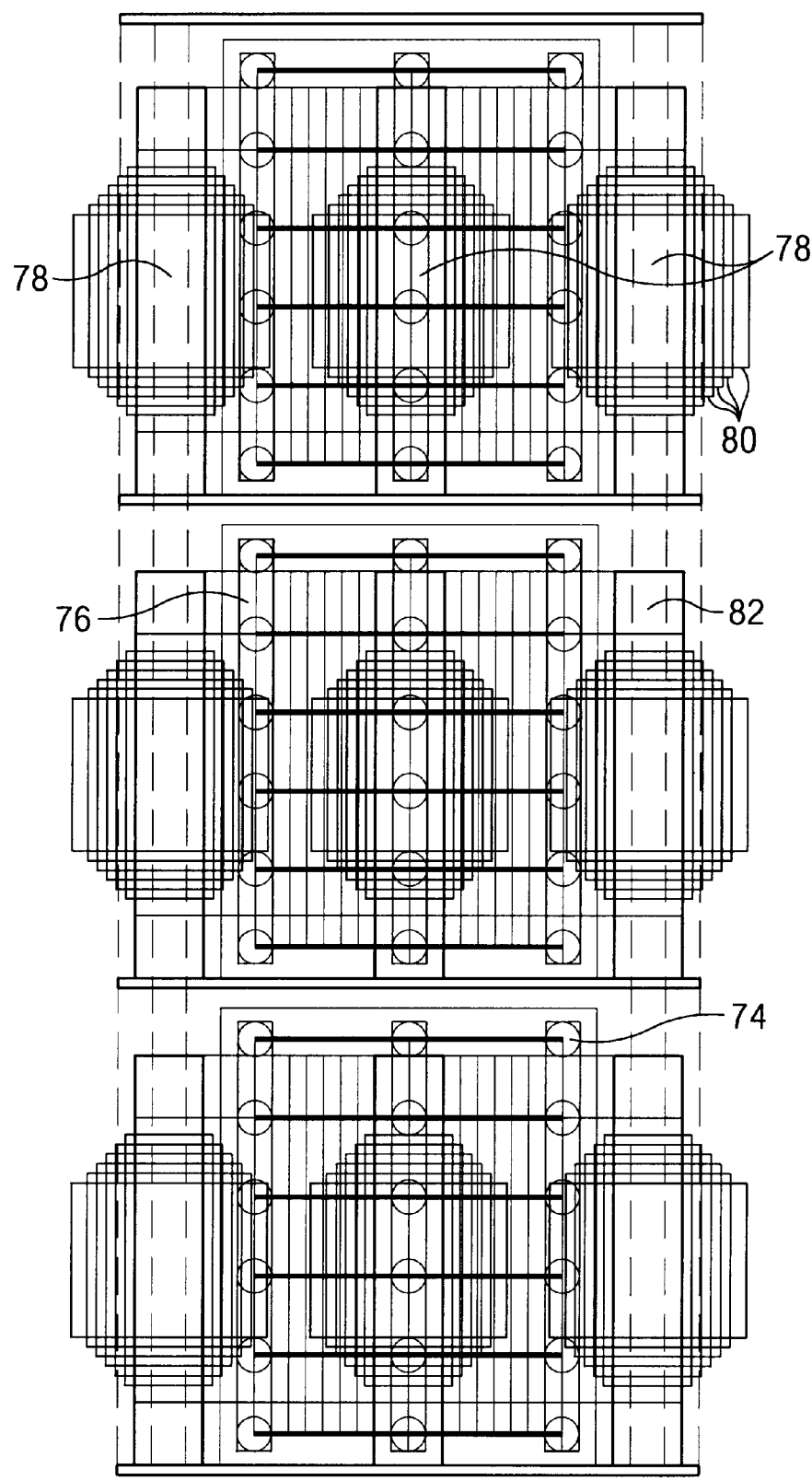
Figures 1, 2D:
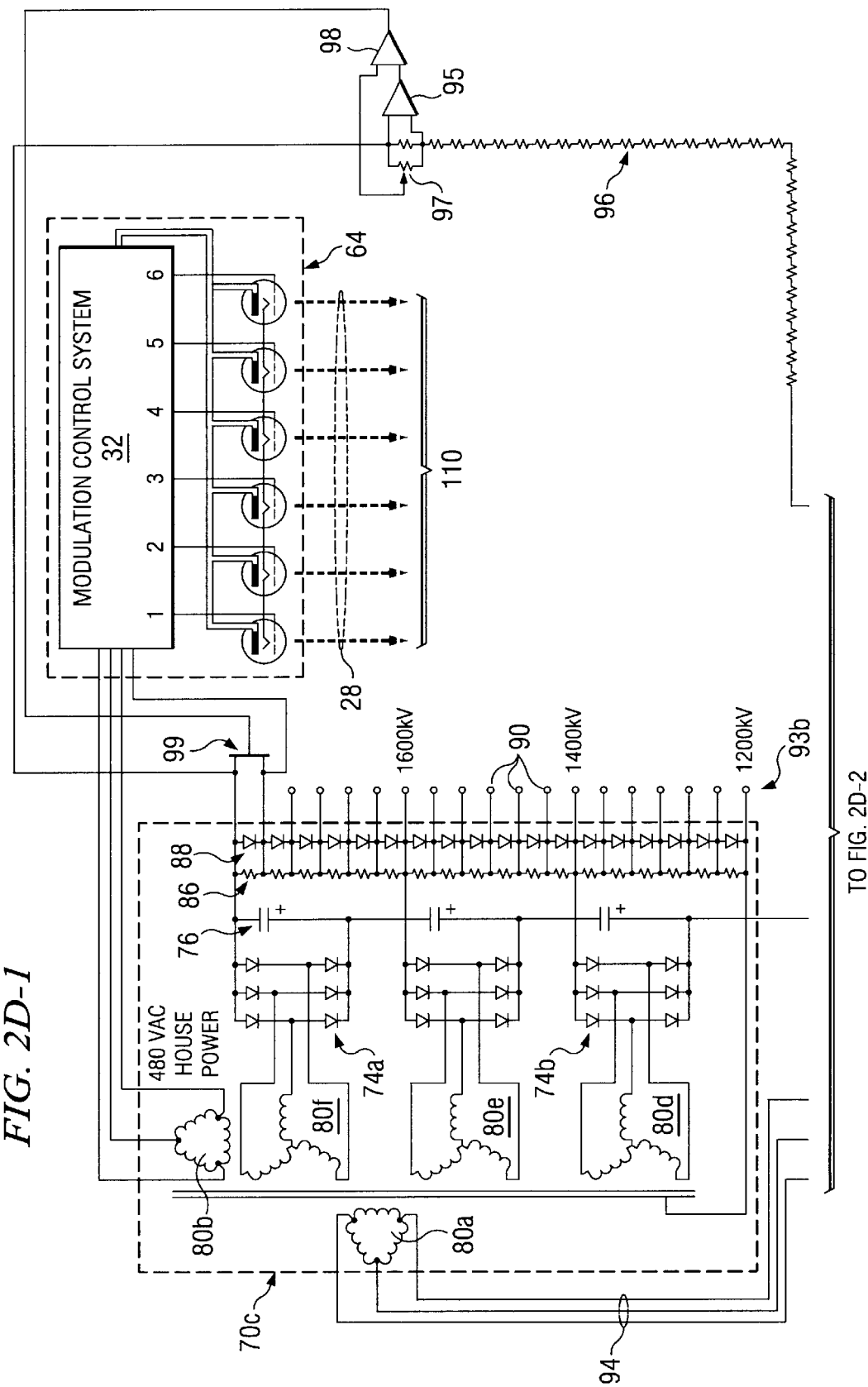
FIG. 2D is an electrical schematic drawing illustrating the power system as shown in FIG. 2A in accordance with the present invention.
Figures 2, 2D:
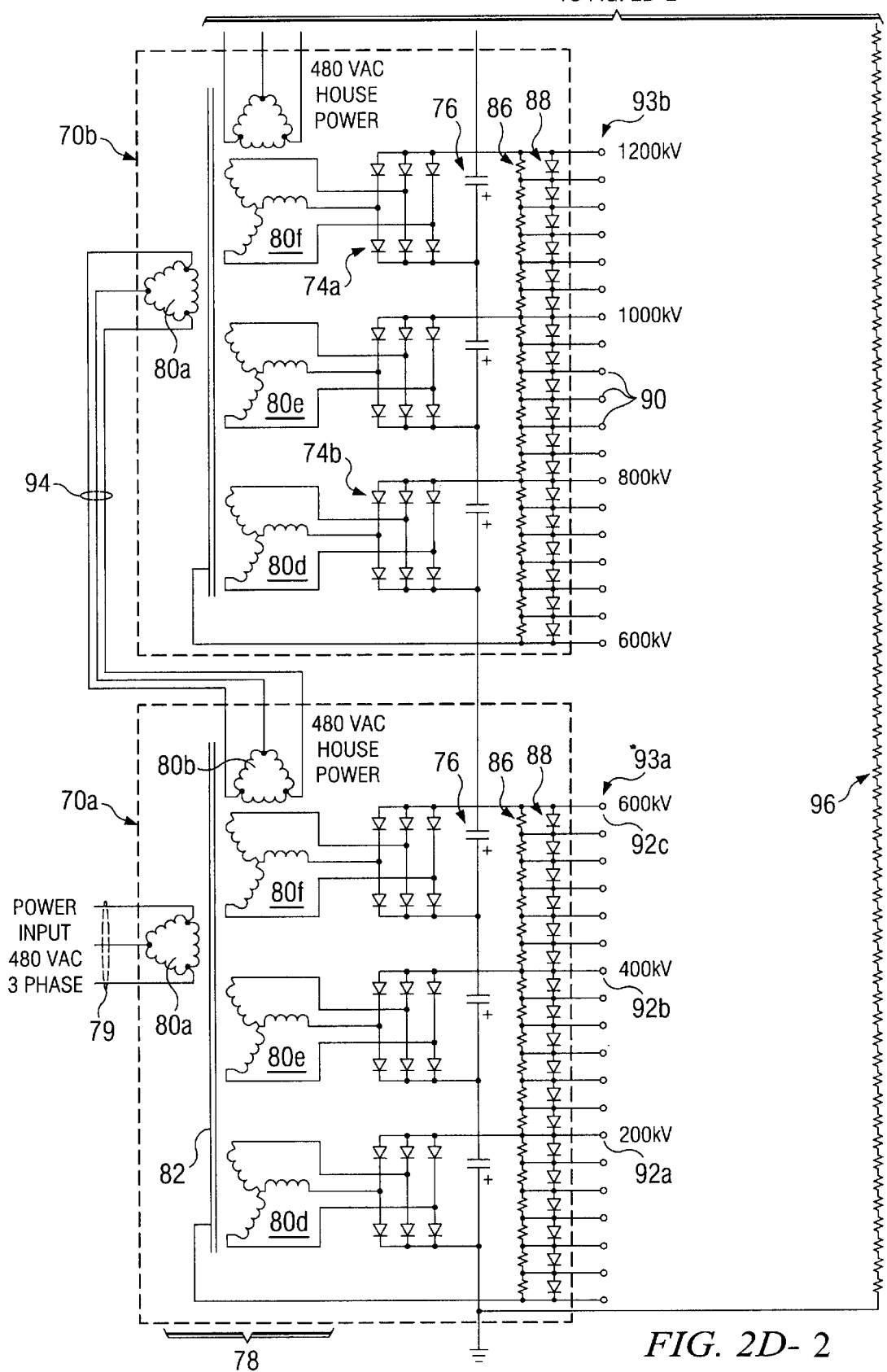

Referring to FIG. 1, the electronic pasteurization system 20 preferably includes a modulation control system 32. The modulation control system 32 comprises a detector system 34 and a logic control system 36. As will be described in greater detail below, the modulation control system 32 turns "on" the electron beam 28 only when the target 30 is correctly positioned within the treatment station 26. The modulation control system 32 operates in conjunction with the accelerator 22 and the treatment station 26 to modulate, or turn "on" and turn "off," the electron beam 28 at the appropriate point. The accelerator 22 must be capable of producing a modulated electron beam 28. Conventional accelerators 22 generally do not allow for modulation. Accordingly, the preferred embodiment of the accelerator 22 allows the electron beam 28 to be modulated.

The detector system 34 detects the position of each target 30. In one embodiment, as illustrated in FIG. 1, the detector system 34 comprises a digital camera system that communicates the size and location of each target 30 to the logic control system 36. It will be understood that the detector system 34 may comprise any suitable system for determining when the electron beam should be modulated such that only the target 30 is exposed to the electron beam 28. For example, the detector system 34 may comprise a LED sensor array that detects the outline of each target 30 as each target 30 passes over the LED sensor array. The detector system 34 may also comprise an electron detector that detects when the electron beam 28 is not engaging the target 30.

The logic control system 36 determines the on and off timing sequence for the electron beam 28 such that the electron beam 28 scans across the entire surface of the target 30. The timing sequence is based on the information received from the detector system 34. As described in greater detail below, the process of the electron beam 28 scanning across the target 30 is analogous to the operation of a television picture tube.

FIG. 1B is a schematic drawing illustrating the operation of the modulation control system 32. A number of targets 30, illustrated as food patties, are shown on a conveyer system 38. The conveyer system 38 is shown moving from left-to-right. As the targets 30 move on the conveyer system 38, the electron beam 28 scans across the surface of each target 30. The electron beam 28 is turned "on" by the logic control system 36 when the electron beam 28 will contact the target 30, and the electron beam 28 is turned "off" when the electron beam 28 will not contact the target 30.

The operation of the modulation control system 32 is analogous to the operation of a television picture tube. In the case of a television picture tube, an individual electron beam continuously scans horizontal lines across the picture tube at a very fast speed. The electron beam strikes a light emitting material on the back of the picture tube. The amount of light emitted by the material depends upon the intensity of the electron beam striking the material. In this manner, a picture can be produced by varying the intensity of the electron beam as it scans across the face of the picture tube.

In a similar manner, the modulation control system 32 modulates the electron beam 28 such that the electron beam 28 is "on" only when a surface of the target 30 will be impinged by the electron beam 28. In contrast, conventional electron beam irradiation systems are not modulated and the electron beam 28 remains operational at all times. Thus, the electron beam 28 continuously operates even when scanning over the empty areas between the targets 30. Accordingly, when the electron beam 28 is not contacting the target 30, the shielding of the treatment station 26 must absorb the entire energy of electron beam 28.

The modulation control system 32 increases the operating efficiency of the electronic irradiation system 20 by decreasing the percentage of time that the electron beam 28 is not striking the target 30. In addition, the electronic pasteurization system 20 is operationally safer and may not require as much shielding because the electron beam 28 is operating for a shorter length of time and the shielding is only required to absorb scatter radiation from the target 30 instead of the entire energy of the electron beam 28.

The electronic pasteurization system 20 has been described with reference to several preferred embodiments. It will be appreciated that each of the preferred embodiments may be incorporated independently or in any suitable combination into the electronic pasteurization system 20. For example, a conventional accelerator 20 and beam transport system 24 may be used in conjunction with the preferred embodiment of the treatment station 26. In this example, significant cost reductions will be realized due to reduced costs associated with the treatment station 26 and the ability to directly integrate the treatment station 26 into large scale food processing operations.

FIG. 2A is a side view of a schematic drawing of a modular accelerator 22a. In this embodiment, the modular accelerator 22a comprises a power system 50 and an accelerator column 52 disposed within a shell 54. As will be discussed in greater detail below, the power system 50 produces a voltage differential across the length of the accelerator column 52, which accelerates the electron beam 28.

The shell 54 comprises a lower shell section 56a and an upper shell section 56b that are assembled at a sealed joint 58. The shell sections 56a and 56b can be separated at the sealed joint 58 to provide access to the power system 50 and the accelerator column 52. An insulating media 60 is disposed within the shell 54 and operates to cool the power system 50. The insulating media 60 generally comprises an insulating transformer oil, such as DIAZA™. The shell 54 also includes a vent 61 disposed in the upper shell section 56b that allows the insulating media 60 to thermally expand and contract during operation of the modular accelerator 22a.

A dry dome 62 may be disposed within the shell 54. The dry dome 62 generally surrounds the upper portion of the accelerator column 52 and provides a dry environment separate from the insulating media 60. An electronics package 64 as well individual components of the accelerator column 52 are contained within the dry dome 62. A second insulating media 66 is preferably disposed within the dry dome 62. The second insulating media 66 operates to cool the electronic components within the dry dome 62. In one embodiment, the second insulating media 66 comprises the gas sulfur hexafluoride at ambient pressure. Conventional accelerators do not provide a separate compartment for the electronics package 64. In particular, the electronics package 64 is generally immersed in the insulating media 60, which degrades the performance of the electronics package 64. Maintaining the electronics package 64 in the second insulating media 66, instead of the insulating media 60, increases the performance and life expectancy of the electronics package 64.

The power system 50 comprises a guard ring assembly 68 surrounding one or more power assemblies 70. Each power assembly 70 produces a sequence of voltages 72 that are applied to the accelerator column 52 to produce a high intensity electrical field for accelerating the electron beam 28. The guard ring assembly 68 grades, or smooths, the electrical potential created by the power assemblies 70 to effectively prevent electrical breakdown of the insulating media 60.

FIGS. 2B and 2C are rotated side views of the schematic drawing of the power system 50, and FIG. 2D is an electrical schematic drawing of the power system 50. Referring to FIGS. 2A, 2B, 2C, and 2D, the power system 50 is shown with a first, second, and third power assembly, 70a, 70b, and 70c, respectively. As described in greater detail below, each power assembly 70 is configured to produce on the order of 600 kV. It will be appreciated that each power assembly 70 may be reconfigured by one skilled in the art to produce a higher or lower increment of power. For example, as described in greater detail below, reducing the number of windings in the transformer will reduce the incremental voltage produced by the power assembly 70. Accordingly, the incremental voltage produced by each power assembly 70 can be configured for the application.

The number of power assemblies 70 incorporated into the modular accelerator 22a depends upon the application. For example, in the configuration illustrated, each power assembly 70 produces a voltage differential on the order of 600 kV, and the combination of the three power assemblies 70 produces a voltage differential on the order of 1.8 MV. Two power assemblies 70 would produce on the order of 1.2 MV, four power assemblies 72 would produce on the order of 2.4 MV, and so on. The number of power assemblies 70 that can be combined is generally limited by electrical breakdown of the insulating media 60, which is on the order of 2,500,000 V. The ability to easily configure the power rating of the modular accelerator 22a reduces the design and construction costs associated with the modular accelerator 22a.

In the embodiment illustrated in FIGS. 2B and 2C, each power assembly 70 comprises a 3-phase Δ-Y transformer 72, a number of rectifiers 74, and a number of filter capacitors 76. As illustrated the 3-phase transformer 72 includes three coil assemblies 78, with each coil assembly 78 having a number of windings 80 surrounding a laminated steel core 82. Each coil assembly 78 comprises a primary winding 80a, a house power winding 80b, and at least one high-voltage winding 80c. Generally, each coil assembly 78 also includes three secondary high-voltage windings 80d, 80e, and 80f. The windings 80 are each wound one upon the other, with a layer of electrical insulation (not expressly shown), such as KAPTON™ or an equivalent insulative material, separating adjacent coils within the coil assembly 78 to provide high-voltage insulation.

In general, an input AC voltage 79 is applied to the primary winding 80a of each coil assembly 78. Generally, the three-phase input voltage is 480 V. The primary winding 80a of each coil assembly 78 are connected in a Δ configuration, in which the leads of the three primary windings 80a are interconnected to form a closed circuit.

Each high-voltage winding 80c has N times more turns than the primary winding 80a. Consequently, each high-voltage winding 80c produces an output AC voltage that is N times greater than the input AC voltage. Generally the turns ratio is on the order of 250.

The first secondary high-voltage winding 80d of each coil assembly 78 in the power assembly 70 are connected in a Y configuration, in which one lead from each coil assembly 78 is connected to a common node. The opposite end of the first secondary high-voltage winding 80d is connected to two rectifiers of the rectifier bank 74. Specifically, the opposite ends of each of the secondary high voltage windings 80d,e,f are connected to a pair of rectifiers, oriented in opposing polarities. The three diodes 74a that are connected at their negative terminals to the three secondary high voltage windings are connected in parallel at their positive terminals. The three diodes 74b that are connected at their positive terminals to the three secondary high voltage windings are connected in parallel at their negative terminals. A filter capacitor 76 is connected from the positive terminal of the first rectifier 74a to the negative terminal of the second rectifier 74b, with the positive polarity of the filter capacitor 76 connected to the positive terminal of the first rectifier 74a. Positive terminal, as used herein, means the terminal that will attain a positive voltage when the diode is connected in a rectifier circuit driven by an ac waveform.

A series network 84 of resistors 86 and protection diodes 88 are connected in parallel with the capacitor 76. Typically, the series network 84 comprises six resistors 86 and six protection diodes 88, with each resistor 86 and protection diode 88 connected in parallel. An electrode terminal 90 is connected to the terminals of each resistor 86 and protection diode 88 pair. Each electrode terminal 90 is connected to an accelerating lens 112 of the accelerator column 52.

The resistors 86 provide open-circuit bleed resistance. The protection diodes 88 have a turn-on voltage of approximately 120% of the maximum voltage that should be developed across them during normal operation of the power assembly 70. In the event of an electrical discharge in the power assembly 70, or in its load, the protection diodes 88 would turn on and clamp the voltage across the rectifiers 74 and capacitors 76 so that the components would not be damaged.

The network of rectifiers 74, filter capacitors 76, resistors 86, and protection diodes 88 constitute a single stage 92a of the power assembly 70. For the embodiment illustrated, the output voltage of the stage 92 is approximately 200,000 V.

The high-voltage windings 80c of each coil assembly 78 are connected in the manner described above to form a second stage 92b. The high-voltage windings 80f are connected in a similar manner to form a third stage 92c. The three stages, 92a, 92b, and 92c, are connected in series, with the terminals of the series connection forming the high-voltage output of the power assembly 70 at a high voltage terminal 93. For the embodiment illustrated, the output voltage developed across each power assembly 70 is approximately 600,000V.

The house-power winding 80b has the same number of turns as the primary winding 80a. The house-power winding 80b provides a 3-phase AC isolated power 94 that is input power for the next successive power assembly 70 within the modular accelerator 22a. Specifically, the house-power winding 80b of the first power assembly 70a is coupled to the primary winding 80a of the second power assembly 70b and provides isolated power 94 to the second power assembly 70b. The primary winding 80b and the core 82 of the second power assembly 70b are connected through a resistance to the high voltage output terminal 93a. The house-power winding 80b of the second power assembly 70b is coupled to the primary winding 80a of the third power assembly 70c and provides isolated power 94 to the third power assembly 70b. The primary winding 80b and the core 82 of the third power assembly 70b are connected through a resistance to the high voltage output terminal 93b. In this way the local potential difference between the windings and cores on any power assembly 70 is nowhere greater than 600,000 V. The house-power winding 80b of the third power assembly 70c supplies 3-phase power to the modulation control system 32.

The DC voltage at the high-voltage output terminal 93 produces a residual AC voltage ripple that remains after the filtering of the AC voltage ripple by the filter capacitors 76. The amount of residual ripple is determined by the value of capacitance of the filter capacitors 76. Generally, the residual ripple is approximately 0.1% of the voltage at the high-voltage output terminal 93c. For optimum transport of the electron beams 28, the AC voltage ripple should be suppressed and the voltage applied to the electron gun array 110 should be regulated. A regulator circuit 95 may be provided to actively regulate the voltage supplied to the electron gun array 110, discussed in detail below. The regulator circuit 95 comprises a resistive divider 96, a voltage reference 97, a feedback amplifier 98, and a pass transistor 99 that regulates the voltage that is delivered to the electron gun array 110 within a range between the voltages of the top two electrode terminals.

The provision of providing the isolated power 94 to each succeeding power assembly 70 from the house-power winding 80b of the previous power assembly 70 provides several advantages over conventional DC electron accelerators. For example, a conventional insulating-core transformer could produce terminal voltages on the order of 2,500,000 V, the energy efficiency of the transformer is only about 50%. The energy losses are dissipated in the coils and insulation.

In the modular accelerator 22a, the windings 80 of the coil assemblies 78 are coupled magnetically within the laminated steel core 82. Because the laminated steel core 82 is not segmented like a conventional insulating-core transformer, the laminated steel core 82 provides magnetic coupling among all the coil assemblies 78 with an extremely high coupling efficiency, at least 95%. The overall efficiency with which power can be transferred up the sequence of power assemblies 78 is approximately 95%. Little power is lost in the coil assemblies 78 and insulation. As a result, the modular accelerator 22a is capable of delivering electron beams 28 with total beam power of at least 200 kW with high energy efficiency and reasonable provisions for cooling. The modest amount of waste heat that is lost is transferred efficiently through the insulating media 60, and can be removed using a small heat exchanger (not expressly shown) located on the outside of the lower shell section 56a.

Figure 2E:
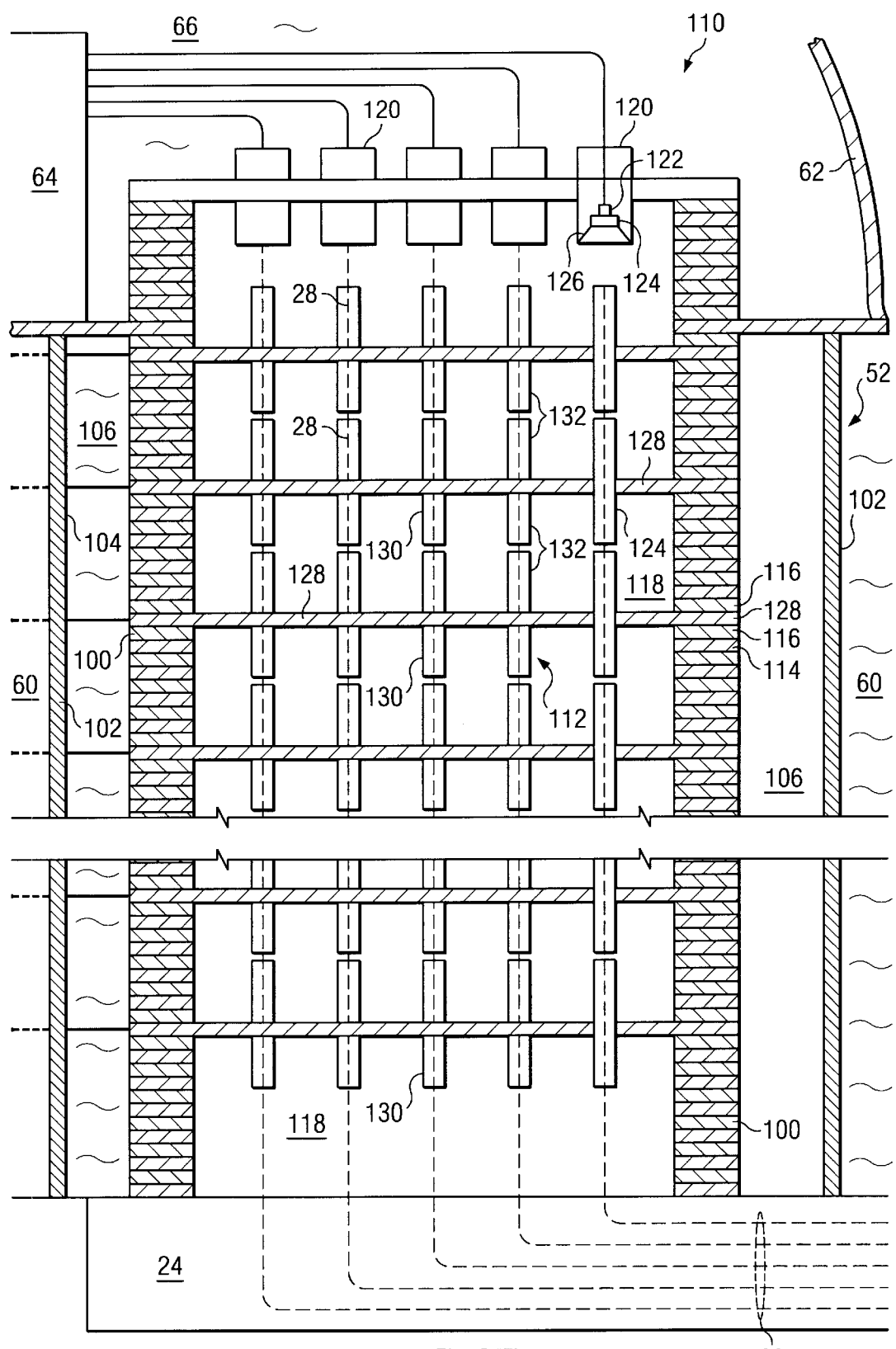
FIG. 2E is a cross sectional drawing illustrating an accelerator column taken along line 2E—2E of FIG. 2A in accordance with the present invention.
Figure 2F:
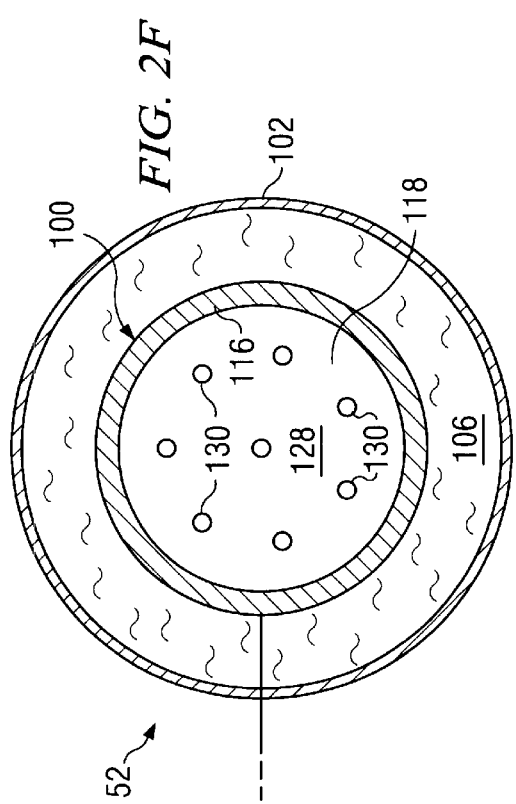
FIG. 2F is a cross sectional drawing illustrating the accelerator column taken along line 2F—2F of FIG. 2A in accordance with the present invention.

FIG. 2E is a cross sectional drawing of the accelerator column 52 taken along line 2E—2E of FIG. 2A, and FIG. 2F is a cross sectional drawing of the accelerator column 52 taken along line 2F—2F of FIG. 2A. Referring to FIGS. 2E and 2F, the accelerator column 52 comprises an accelerator stack 100 and a casing 102. The casing 102 substantially surrounds the accelerator stack 100 to form a sealed chamber 104 circumferentially around the accelerator stack 102. The casing 102 may be fabricated from any suitable non-metallic material, such as plexiglass. The casing 102 prevents the insulating media 60 from contacting the accelerator stack 100, and also acts as a pressure vessel. In particular, a third insulating media 106 is disposed within the sealed chamber 104 to facilitate electrical insulation and cooling of the accelerator stack 100. In the preferred embodiment, the third insulating media 106 comprises pressurized sulfur hexafluoride at 3–6 atmospheres of pressure. Conventional accelerators insulate and cool the accelerator stack using transformer oil, which can cause coking and failure of the electrical components. Separating the accelerator stack 100 from the insulating media 60, i.e., transformer oil, using the casing 102 optimizes the cooling and electrical insulation characteristics of the accelerator 22. Specifically, the third insulating media 106 eliminates or reduces coking and electrical failures in the accelerator stack 100 as compared to conventional accelerators.

As best illustrated in FIG. 2E, the accelerator stack 100 comprises an accelerator shell 108, an electron gun array 110, and a number of acceleration lenses 112. The accelerator shell 108 comprises alternating conductive and non-conductive layers, 114 and 116, respectively, that are bonded together. In one embodiment, each conductive layer 114 comprises steel, and each non-conductive layer 116 comprises a ceramic insulation material. The interior of the accelerator shell 108 forms an accelerator cavity 118 that is evacuated to a hard vacuum.

The electron gun array 110 is located at the top of the accelerator stack 100 within the dry dome 62 and contains at least one electron gun 120. Each electron gun 120 produces an independent electron beam 28. The number of electron guns 120 in the electron gun array 110 depends upon the application. For example, in an application having six treatment stations 26, an electron gun array 110 having six electron guns 120 would generally be used. In another application, multiple electron beams 28 can be used in a single treatment station 26 to simultaneously treat multiple surfaces of the target 30, thereby requiring a greater number of electron guns 120 than treatment stations 26.

In the preferred embodiment, each electron gun 120 has the capacity to modulate, i.e., turn on and off, its respective electron beam 28. In other words, each electron gun 120 can produce a modulated electron beam 28 independently of the other electron guns 120. In this embodiment, each electron gun 120 comprises a dispenser cathode 122, a graphite grid 124 and a Pierce focusing electrode 126. The dispenser cathode 122 produces the electrons that form the electron beam 28. The dispenser cathode 122 generally comprises a W—Rh thermionic dispenser cathode that can be reactivated by heating the dispenser cathode 122 beyond the normal operating temperature. The graphite grid 124 operates to modulate the electron beam 28 as it exits the dispenser cathode 122. The modulation control system 32 controls the modulation of the electron beam 28 through the graphite grid 124. As discussed previously, modulation allows the electron beam 28 to be directed at the targets 30 and not the empty spaces between the targets 30. Accordingly, the energy efficiency of an electronic pasteurization system 20 using modulation is on the order of 100%. In contrast, conventional electron beam irradiation systems are typically less than 30% energy efficient. The Pierce focusing electrode 126 operates to focus the electron beam 28 into the accelerator cavity 118.

The acceleration lenses 112 are sequentially layered across the accelerator cavity 118. Each acceleration lens 112 comprises a plate 128 coupled to at least one focusing tube 130. The number of focusing tubes 130 corresponds to the number of electron guns 120 within the electron gun array 110. The bores of each corresponding focusing tube 130 on each plate 128 is aligned with the respecting electron gun 120. In other words, there is a direct line of site path from the electron gun 120 through the focusing tubes 130. A longitudinal gap 132 is formed between consecutive focusing tubes 130.

Each acceleration lens 112 is coupled to the power system 50 such that the differential voltage applied to each acceleration lens 112 is incrementally increased. For example, in one embodiment, the differential voltage applied to each successive acceleration lens 112 is 50 kV. In other words, the acceleration lens 112 adjacent the electron gun 120 has a differential voltage of 50 kV, and the next successive accelerations lens 112 has a differential voltage of 100 kV, and so on. The differential voltage between each acceleration lens 112 produces an electric field in the longitudinal gap 132.

Each electron beam 28 is accelerated and focused transversely in the longitudinal gap 132. By arranging the spacing of the focusing tubes 130 such that the longitudinal gap 132 is not greater than the lateral spacing between each electron beam 28, each electron beam 28 is accelerated independently. This allows each electron beam 28 to be independently modulated without affecting the neighboring electron beams 28. The electric field in the longitudinal gaps 132 is also configured to maintain a beam size that corresponds to the magnetic elements in the beam transport system 24.

Figure 3A:
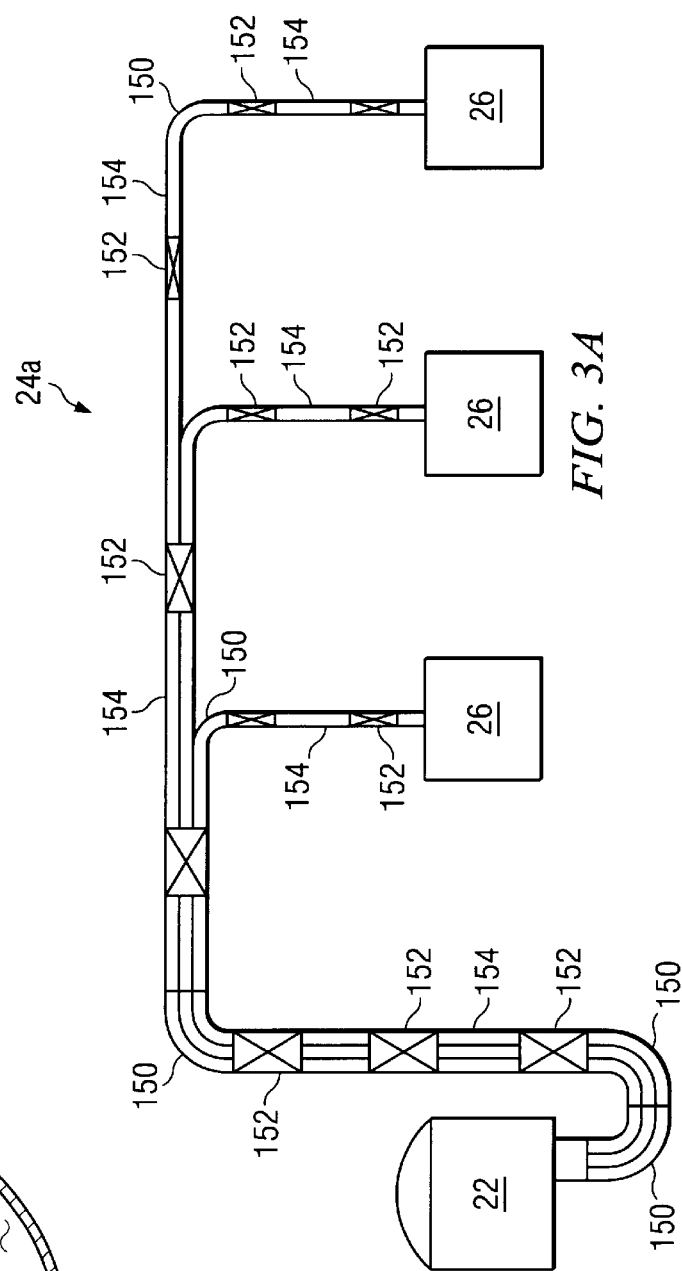
FIG. 3A is a schematic drawing illustrating a modular beam transport system in accordance with the present invention.

FIG. 3A is a schematic drawing of a modular beam transport system 24a operable to communicate at least one electron beam 28 from the accelerator 22 to the treatment station 26. The modular beam transport system 24a comprises bending modules 150, focusing modules 152, and beam tubes 154. The bending modules 150 allow the electron beam 28 to be bent to any suitable angle. For example, the bending modules 150 are generally configured in 90 degree bend elbows, however, any suitable angle may be fabricated. The focusing modules 152 are installed at regular intervals throughout the length of the modular beam transport system 24a to continually refocus each electron beam 28. The beam tubes 154 are tubular members that communicate the electron beam 28 to the respective treatment station 26. Each electron beam 28 is communicated within its own beam tube 154 that is evacuated to very low pressures in order to reduce losses and scatter from the electron beam 28 interacting with air or other contaminates.

The bending modules 150 and focusing modules 152 can be configured to carry any number of electron beams 28 to nearly any location without any appreciable energy loss in the electron beam 28. Assembly of the modular beam transport system 24a is analogous to a plumbing system. For example, in food processing applications, the modular beam transport system 24a will likely involve transporting multiple electron beams 28 from a remote modular accelerator 22a, across the roof of the facility, with each electron beam 28 being routed down from a separate location on the roof to a respective treatment station 26. Once assembled, the modular beam transport system 24a requires minimal maintenance due to its use of permanent magnets. The modular beam transport system 24a is generally more robust as compared to conventional beam transport systems. In addition, the modular beam transport system 24a does not utilize electromagnets, that require an active electrical power system along the entire length of the beam transport system, as used in conventional beam transport systems.

FIG. 3B is a perspective drawing illustrating one embodiment of the bending module 150. FIG. 3C is a cross sectional drawing illustrating an individual bending block 156. Each bending module 150 comprises at least one bending block 156. For example, the bending module 150 shown in FIG. 3C illustrates a 3×4 array configuration of bending blocks 156. It will be appreciated that the bending module 150 may be otherwise suitably configured without departing from the scope of the present invention.

Referring to FIGS. 3B and 3C, each bending block 156 comprises a first and second metallic plate, 158 and 160, respectively, separated by an inner and outer magnetic rib, 162 and 164, respectively. The metallic plates, 158 and 160, and the magnetic ribs, 162 and 164, encloses the beam tube 154. In multi bending block 156 applications, as best illustrated in FIG. 3B, each bending block 156 will generally share the adjacent magnetic plates, 158 and 160, as well as the adjacent magnetic ribs, 162 and 164.

The magnetic ribs, 162 and 164, are generally formed from a number of individual permanent magnets 166. The ends of the permanent magnets 166 are generally beveled (not expressly shown) to allow the permanent magnets 166 to be assembled together to form the radius of the bending module 150. In addition, the inner magnetic rib 162 generally has a stronger magnetic flux than the outer magnetic rib 164, in order to facilitate steering the electron beam 28 through the bending module 150. The metallic plates, 158 and 160, are made of magnetically permeable material, such as steel. As best illustrated in FIG. 3C, the magnetic ribs, 162 and 164, each generate a respective magnetic flux as indicated by the arrows shown in FIG. 3C. The magnetic ribs, 162 and 164, induce a magnetic flux in the metallic plates, 158 and 160, as indicated by the arrows shown in FIG. 3C. The combination of the magnetic fluxes produces a pure dipole magnetic field distribution 168 inside of the beam tube 154, which steers the electron beam 28 through the radius of the bending module 154. The minimum bending radius that the electron beam 28 can be turned using the bending module 150 is approximately 10 centimeters.

As best illustrated in FIG. 3A, at locations where it is necessary to separate one particular beam 28 from a cluster of electron beams 28, the separation can be accomplished using a bending module having only one channel. In that case the particular beam 28 is deflected in the desired direction, while all other beams 28 continue without deflection. In this manner each beam can be extracted from a cluster transport and delivered to a treatment station 26.

Figure 3E:
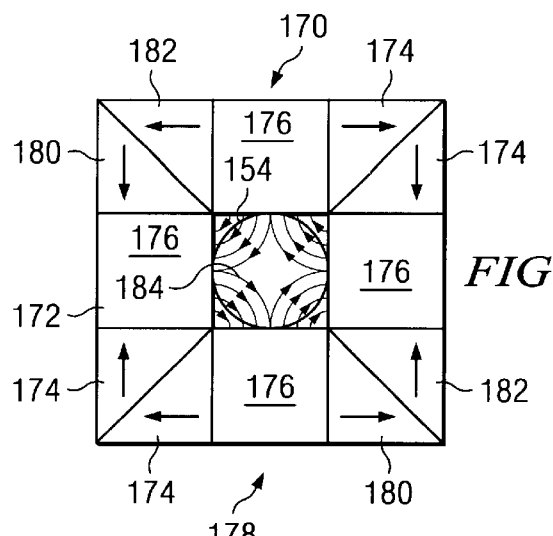
FIG. 3E is a cross sectional drawing illustrating a focusing block as shown in FIG. 3D in accordance with the present invention.
Figure 3D:
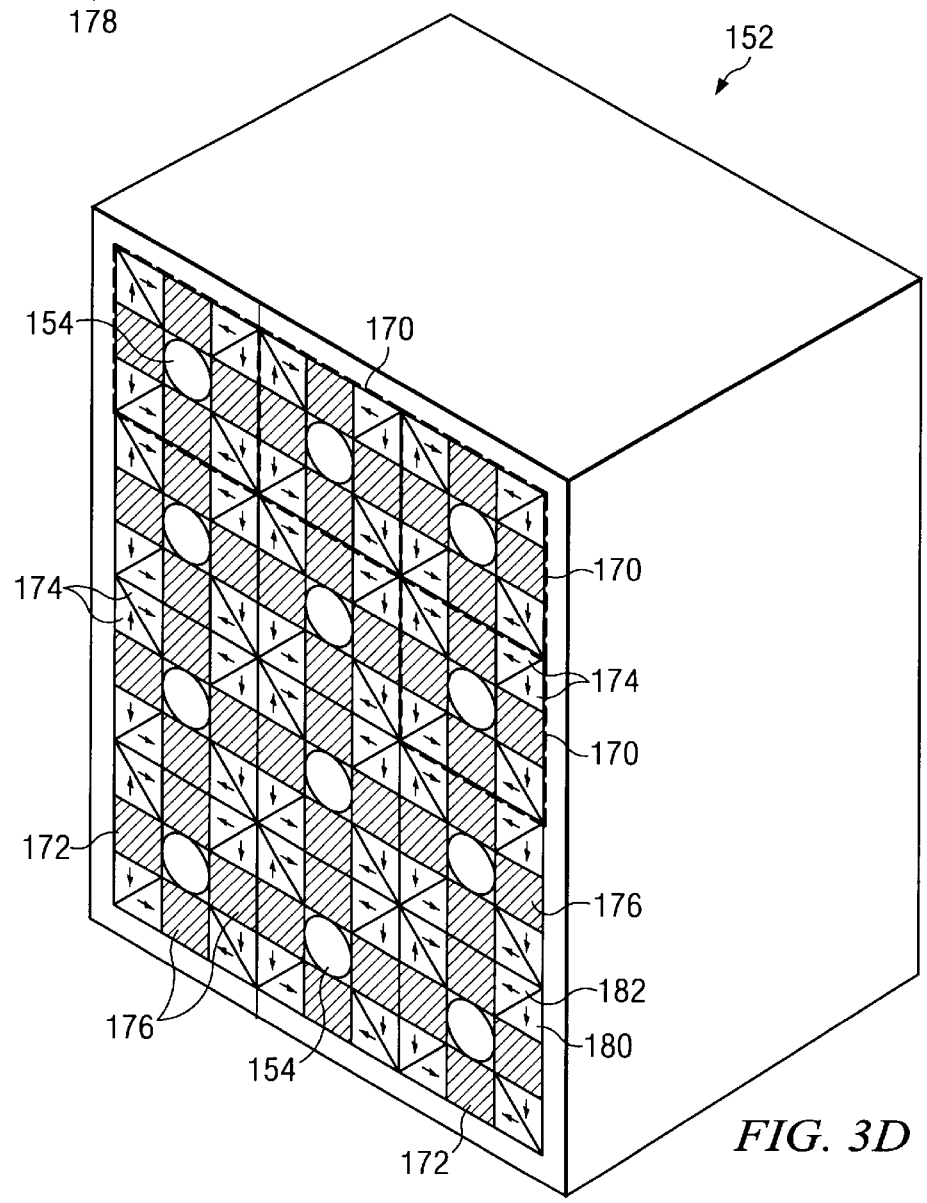
FIG. 3D is a perspective drawing illustrating a focusing module as shown in FIG. 3A in accordance with the present invention.

FIG. 3D is a perspective drawing illustrating one embodiment of the focusing module 152. FIG. 3E is a cross sectional drawing illustrating an individual focusing block 170. Each focusing module 152 comprises at least one focusing block 170. For example, the focusing module 152 shown in FIG. 3D illustrates a 3×4 array configuration of focusing blocks 170. It will be appreciated that the focusing module 152 may be otherwise suitably configured without departing from the scope of the present invention.

Referring to FIGS. 3D and 3E, each focusing block 170 comprises a quadrature core 172 and four corner magnet sets 174. The quadrature core 172 generally comprises four rectangular bars 176 arranged in a cross pattern 178, with the beam tube 154 forming the center of the cross pattern 178. The quadrature core 172 is generally fabricated from a magnetically permeable material, such as steel. Individual corner magnet sets 174 are disposed in each corner of the cross pattern 178. Each corner magnet set 174 generally comprises two permanent magnets, 180 and 182.

As best illustrated in FIG. 3E, each permanent magnet, 180 and 182, in each corner magnet set 174 generates a respective magnetic flux as indicated by the arrows shown in FIG. 3E. Each corner magnet set 174 also induces a magnetic flux in the neighboring elements of the quadrature core 172, as indicated by the arrows shown in FIG. 3E. The combination of the magnetic fluxes produces a quadrupole magnetic field 184 within the beam tube 154. In the embodiment illustrated, the quadrupole magnetic field 184 operates to focus the electron beam 28 in the horizon plane, but defocus the electron beam 28 in the vertical plane. Rotating each focusing block 170 by 90 degrees produces a magnetic field (not expressly shown) that focuses the electron beam 28 in the vertical plane, but defocuses in the horizontal plane. Accordingly, horizontal focus and vertical focus focusing blocks 170 are generally alternated throughout the length of the modular beam transport system 24a in order to stabilize the electron beam 28.

Figure 4:
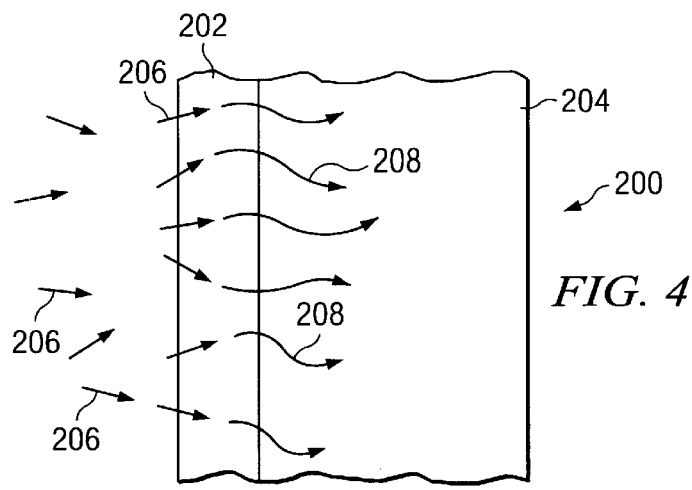
FIG. 4 is a cross sectional drawing illustrating a multilayer shielding system in accordance with the present invention.

FIG. 4 is a cross sectional view of a multilayer shielding system 200. The multilayer shielding system 200 comprises a first layer 202 and a second layer 204. The first layer 202 comprises a material having a low atomic number, such as aluminum. The second layer 204 comprises any material or combination of materials operable to absorb soft X-rays, such as lead. Individual electrons 206 striking the first layer 202 produce soft X-rays 208 that are then absorbed by the second layer 204.

Conventional shielding generally utilizes a high atomic number material, such as lead, to stop the radiation. Conventional wisdom normally dictates that the thickness of the shielding, i.e., lead, is increased until the required level of shielding is obtained. Conventional wisdom did not recognize that in electron radiation applications, the reason the thickness of the shielding was so high was because of the high atomic number material. Specifically, an electron 206 hitting a high atomic number atom produces an X-ray having a higher energy level than an X-ray produced by an electron 206 hitting a low atomic number material. The high energy level X-ray, or hard X-ray, can penetrate deeply into the shielding. Accordingly, conventional shielding must be extremely thick to prevent the hard X-ray from penetrating the shielding to the outside environment.

The present invention avoids the production of hard X-rays by using a low atomic material in the first layer 202. An electron 206 striking a low atomic number atom produces a soft X-ray 208, which has a substantially lower energy level than a hard X-ray. The thickness of second layer 204 required to stop the soft X-ray 208 is substantially lower than the thickness required to stop a hard X-ray. Accordingly, the multilayer shielding system 200 provides the same level of shielding against electron radiation as conventional shielding that is significantly thicker. In particular, the thickness of the multilayer shielding system 200 is generally an order of magnitude thinner as compared to conventional shielding for the same level of electron radiation protection. As a result, treatment stations 26 using the multilayer shielding system 200 are much smaller than conventional treatment stations 26, and can be sized to fit within existing food preparation facilities.

Figure 5:
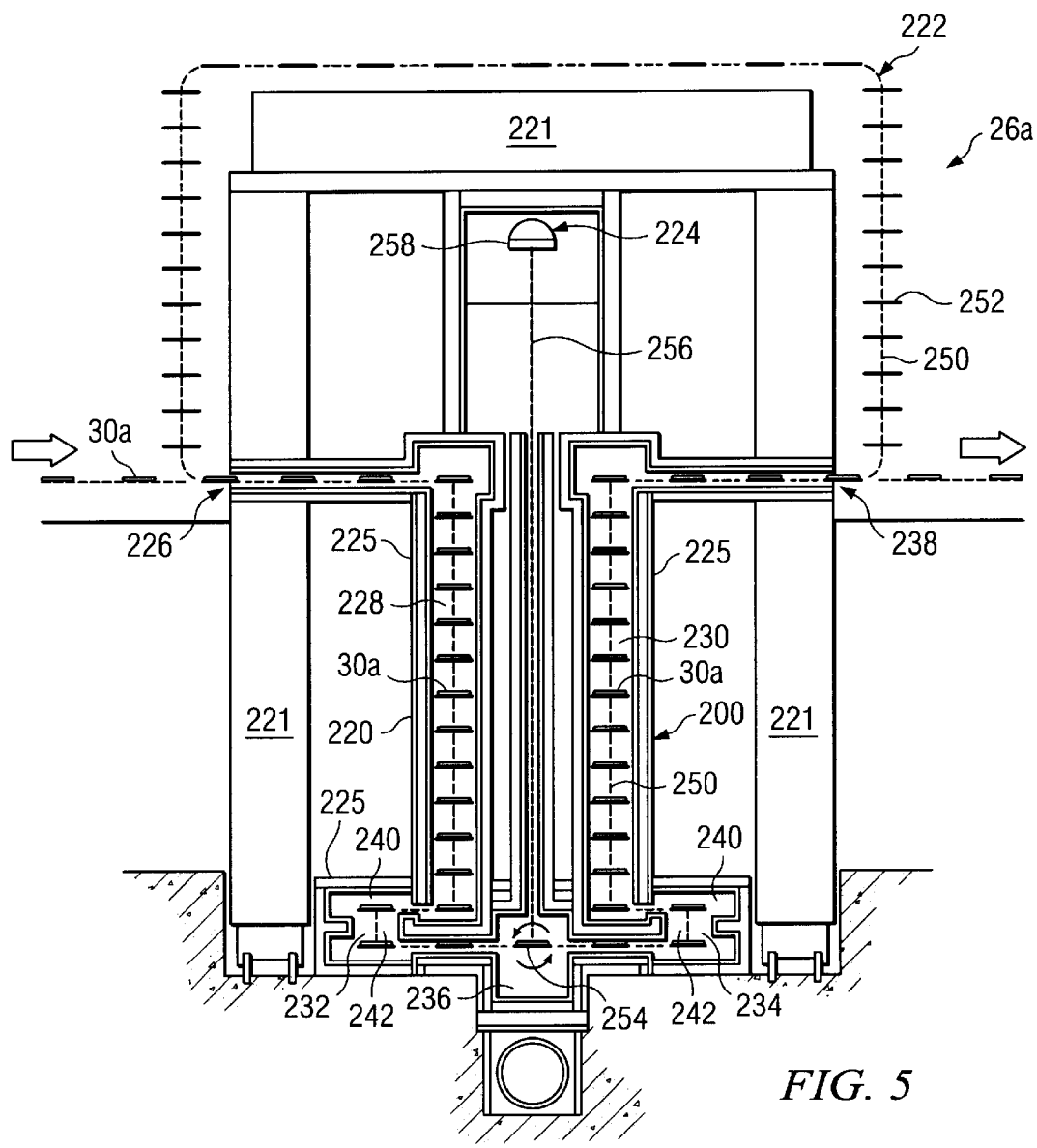
FIG. 5 is a schematic side view drawing illustrating a treatment station for treating patty targets in accordance with the present invention.

FIG. 5 is a cross sectional view illustrating a labyrinth treatment station 26a for irradiating targets 30a that are relatively thin and are generally in the form of patties. The labyrinth treatment station 26a comprises a labyrinth structure 220, a containment structure 221, a continuous conveyer system 222, and an electron beam scan system 224. The labyrinth structure 220 comprises a plurality of walls 225 that form an entry 226, a first vertical blind 228, a second vertical blind 230, a first trap 232, a second trap 234, a treatment chamber 236, and an exit 238. The traps, 232 and 234, each include horizontal and vertical catches, 240 and 242, respectively. The walls 225 preferably incorporate the multilayer shielding system 200, as described previously.

The containment structure 221 substantially surrounds the labyrinth structure 220 and acts as a final barrier to radiation escaping the labyrinth treatment station 26a. The containment structure 221 is generally fabricated using lead panels that can be removed to allow access to the interior of the labyrinth treatment station 26a.

The labyrinth structure 220 in conjunction with the containment structure 221 prevents electrons scattered from the target 30a, and the X-ray radiation produced by the scattered electrons, from escaping the labyrinth treatment station 26a. In operation, the target 30a is exposed to the electron beam 28 in the treatment chamber 236. Although the target 30a absorbs substantially all of the electron beam 28 during the irradiation process, a few electrons are scattered from the target 30a. The walls 225 forming the treatment chamber 236 absorb most of the scattered electrons. A few scattered electrons escape the treatment chamber 236 to the traps, 232 and 234. The walls 225 forming the traps, 232 and 234, absorb most of the scattered electrons. A few of the scattered electrons entering the traps, 232 and 234, escape to the vertical blinds, 228 and 230. The walls 225 forming the vertical blinds, 228 and 230, and the targets 30a moving through the vertical blinds, 228 and 230, absorbs substantially all of the scattered electrons that make it this far. The walls 225 forming the entry 226 and exit 238 absorb the few remaining electrons that could escape the labyrinth structure 220. The electrons absorbed by the walls 225 produce X-rays that are then absorbed by the walls 225 and the containment structure 221.

As discussed previously, the level of radiation that many regulatory agencies permit to escape from the treatment station 26 is less than 0.0001 rads per year. Whereas, the electron beam 28 produces a threshold dose of approximately 300,000 rads per second. The labyrinth structure 220 in conjunction with the containment structure 221 reduces the radiation escaping the labyrinth treatment station 26a to a level below regulatory agency standards.

The continuous conveyer system 222 generally comprises a chain drive mechanism 250 and a number of baskets 252. The chain drive mechanism 250 communicates the baskets 252 in a continuous loop through the labyrinth structure 220. The targets 30a are contained within the baskets 252. The baskets 252 are generally constructed from plastic having an open weave pattern that maximizes the exposure of the targets 30a to the electron beam 28.

The continuous conveyer system 222 may also include a flipper mechanism 254 disposed within the treatment chamber 236. The flipper mechanism 254 operates to rotate each basket 252 to allow each side of the target 30a to be irradiated by the electron beam 28. As discussed previously, irradiating multiple surfaces of the target 30a reduces the thickness that the electron beam 28 must penetrate to deliver the required ionizing radiation dose. Therefore, a less powerful accelerator 22 is required and the thickness of the shielding in the labyrinth treatment station 26a is reduced.

The electron beam scan system 224 produces a thin divergent fan beam 256. The fan beam 256 is produced by periodically varying the current in a focusing electromagnet 258. The electron beam 28 periodically deflects, or scans, in an arc in response to the periodic change in the magnetic field produced by the focusing electromagnet 258. Due to the number of iterations with which the electron beam 28 scans across the arc, the electron beam 28 appears as a fan, thus the term fan beam.

In a particular embodiment, the modulation control system 32 modulates, i.e., turns on and off, the electron beam 28 as the electron beam 28 is scanned across the arc. Accordingly, the electron beam 28 is painted on the target 30a as the electron beam 28 is scanned across the arc. This improves the beam efficiency of the labyrinth treatment station 26a, as well as reducing the shielding requirements for the labyrinth treatment station 26a.

The labyrinth treatment station 26a allows targets 30a to be continuously processed, i.e., irradiated, without increasing the level of radiation escaping the labyrinth treatment station 26a. Conventional treatment stations often incorporate multiple shield doors that are closed during irradiation process and then opened to discharge the irradiated targets 30a and receive a new batch of targets 30a. The labyrinth treatment station 26a can safely irradiate more targets 30a than many conventional treatment stations. Accordingly, the irradiation cost per target 30a is much lower with the labyrinth treatment station 26 than conventional treatment stations. This is particularly important in high volume food processing operations.

Figure 6A:
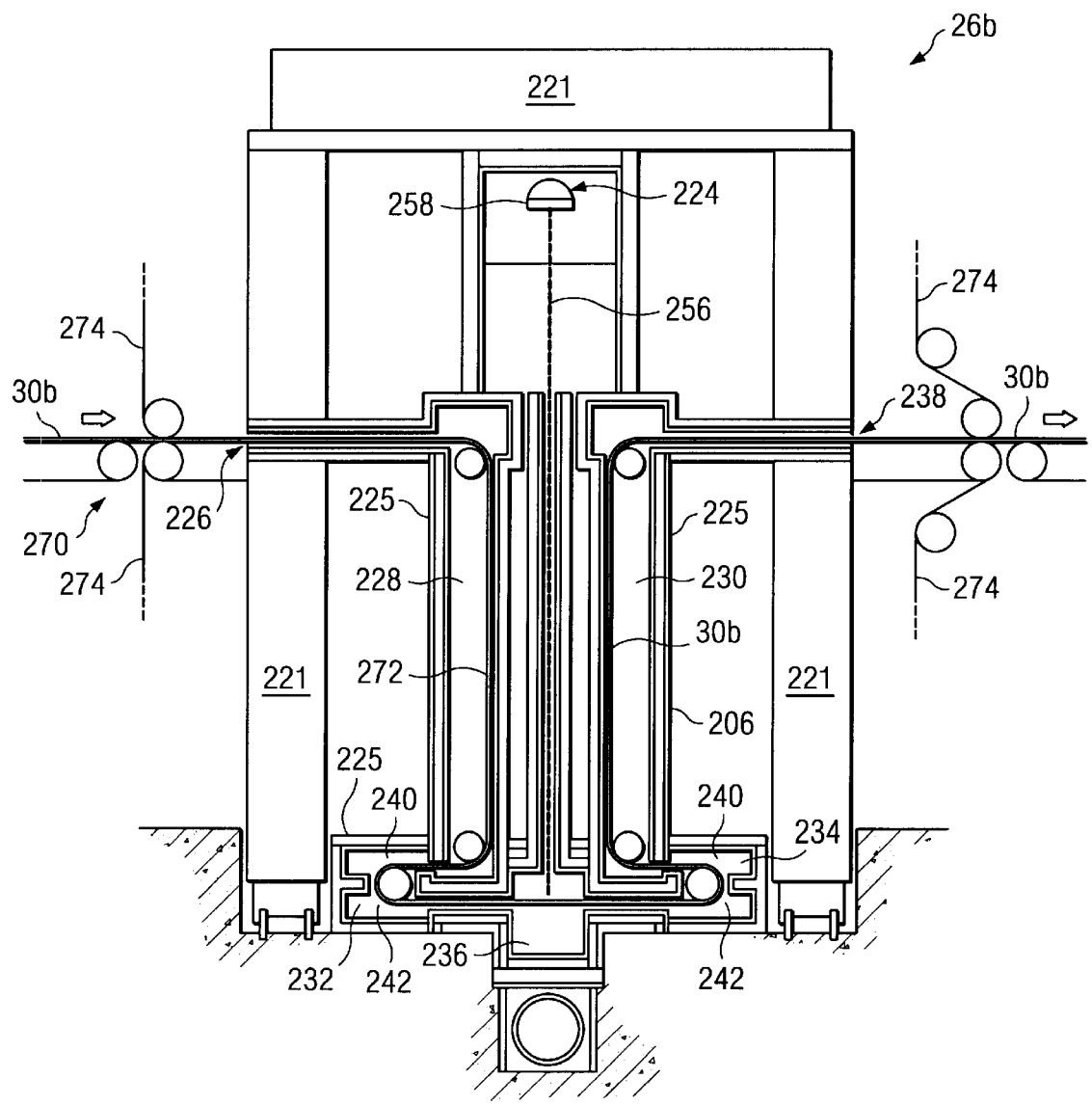
FIG. 6A is a schematic side view drawing illustrating a treatment station for treating sheet targets in accordance with the present invention.

FIG. 6A is a cross sectional view illustrating a labyrinth treatment station 26b for treating a continuous thin sheet target 30b. The labyrinth treatment station 26b is similar to the labyrinth treatment station 26a described above. The labyrinth treatment station 26b utilizes a continuous conveyer system 270 to continuously transport the target 30b through the labyrinth structure 220. The continuous conveyer system 270 comprises a transport system 272 operable to transport the target 30b between a pair of linings 274. In one embodiment, each lining 274 comprises a disposable plastic film applied to each side of the target 30b. In this embodiment, the transport system 272 would provide structural support to the target 30b as it passes through the labyrinth treatment station 26b. In another embodiment, the linings 274 comprise a rigid plastic material, such as teflon, that provides structural support to the target 30b as it travels through the labyrinth treatment station 26b. In this embodiment, the linings 274 may form a continuous loop that continuously reuses the linings 274. The target 30b would be removed from the respective linings 274 by a scraper (not expressly shown).

As discussed previously, conventional treatment stations do not provide for continuous processing of thin sheet targets 30b. Accordingly, the labyrinth treatment station 26b allows a high volume of thin sheet targets 30b to be irradiated quickly and at a lower unit cost. The labyrinth treatment station 26b is particularly well suited for irradiating ground meats prior to packaging.

Figure 6B:
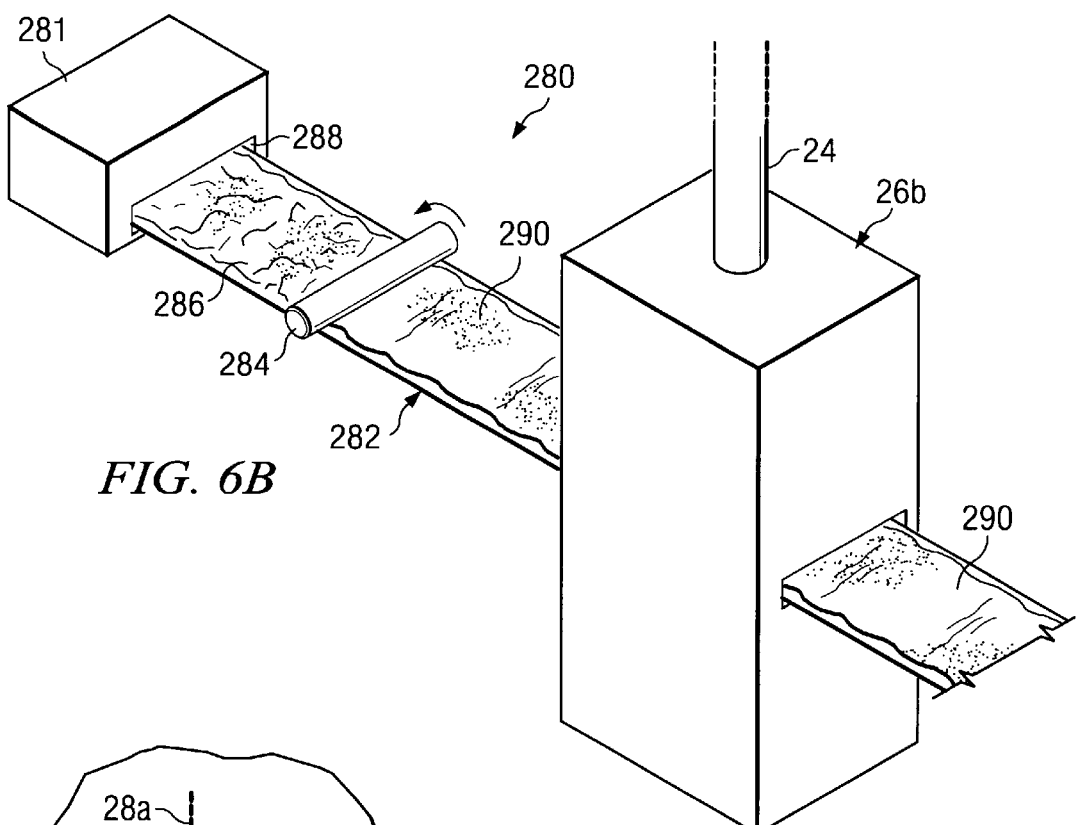
FIG. 6B is a perspective view of a sheet target processing system in accordance with the present invention.

FIG. 6B illustrates a thin sheet processing system 280 that produces thin sheet targets 30b that can be irradiated in the treatment station 26b, described above. In a conventional meat grinding operation, the meat is ground into a bin, and the bin is transported to a machine that extrudes the ground meat into a tubular form to fill round plastic casings, called chubs. Conventional irradiation systems cannot irradiate the chub due to the variable thickness of the chub. By processing the ground meat into thin sheets that are easily irradiated, the ground meat is treated before it is extruded into chubs.

The present invention avoids the problem of treating a thick section of ground meat or other formable material, by first forming the material into a continuous thin sheet. The thin sheet processing system 280 comprises a hopper 281, a conveyer system 282, and a roller mechanism 284. The hopper 281 receives non-irradiated fresh ground meat 286. The conveyer system 282 extracts the non-irradiated fresh ground meat 286 through a slot 288 in the hopper 281. The conveyer system 282 transports the non-irradiated fresh ground meat 286 to the roller mechanism 284. The roller mechanism 284 rolls out the non-irradiated fresh ground meat 286 into a thin sheet 288. The conveyer system 282 transports the thin sheet 288 to the treatment station 26b, wherein the thin sheet 280 is irradiated.

In another embodiment of the labyrinth treatment station 26b, a fluid food material can be transported through the labyrinth treatment station 26b, either as a thin sheet bounded by support films 274 or in a parallel array of thin-wall tubes. Such fluids are sauces, marinades, and processed cheese products.

Another application of irradiation of food is the treatment of whole carcasses. While meat is intact upon a carcass or any section of a carcass, bacterial contamination is a surface problem that can be remedied by treating all surfaces. Conventional irradiation systems have the problem that they can be configured to treat the outside surfaces of a carcass, but not to deliver uniform dose to the internal surfaces of the carcass, viz. the abdominal cavity.

The present invention avoids this problem by configuring two electron beams, directing one electron beam to deliver uniform dose to the external surfaces of a target, and directing the other electron beam to deliver uniform dose to the internal surfaces of a target.

Figure 7B:
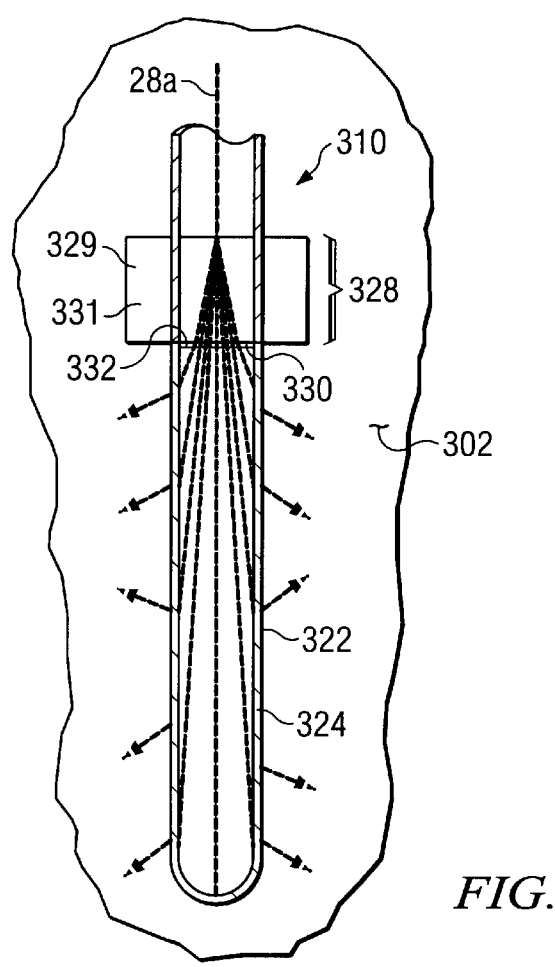
FIG. 7B is a cross sectional view of the stub probe shown in FIG. 7A in accordance with the present invention.
Figure 7A:
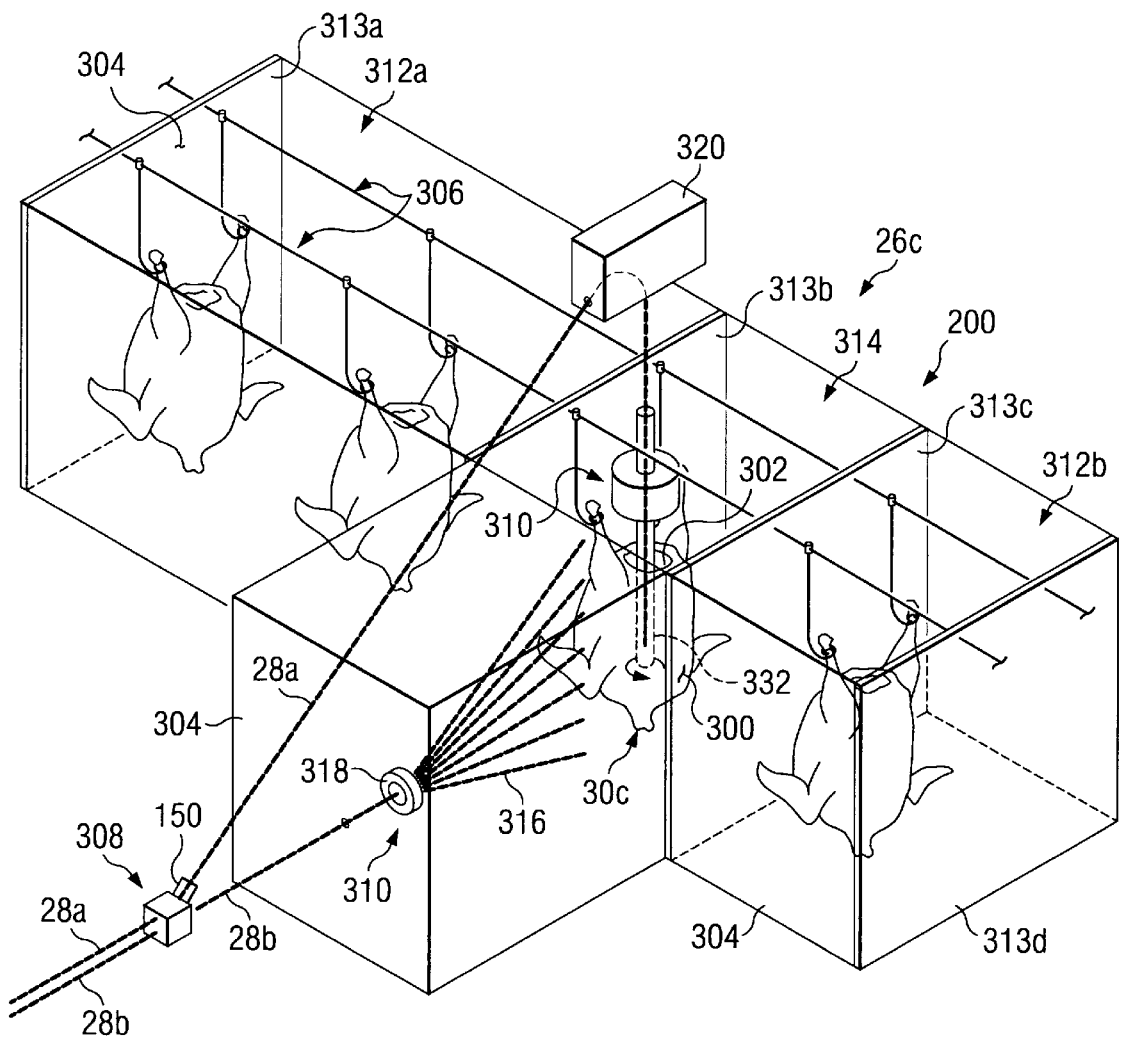
FIG. 7A is a perspective view of a treatment station using an stub probe in accordance with the present invention.

FIG. 7A is a perspective view of a treatment station 26c operable to irradiate an external surface 300 and an internal surface 302 of a target 30c. The treatment station 26c comprises a shielding structure 304, a transport system 306, an external beam system 308, and an internal beam system 310. The external beam system 308 transports two electron beams, 28a and 28b, to the treatment station 26c. A bending module 150 is used to deflect electron 28a upwards where it is conveyed by a beam transport line 320 and used for internal treatment of the target.

The shielding structure 304 in conjunction with the transport system 306 operates to contain the radiation produced by operation of the treatment station 26c. In one embodiment, the shielding structure 304 and the transport system 306 incorporate the multilayer shielding system 200, as described above. In the embodiment illustrated, the transport system 306 comprises a number of containment stalls 312 on a conveyer system 314 that serially interlock with the shielding structure 306 to form a closed treatment chamber 316. An individual target 30c is typically suspended within the containment stall 312, and a sequence of sliding doors 313 are used to introduce each target 30c into the treatment chamber 314, without any requirement for wait time that would slow the operation. Specifically, the target is first moved into containment stall 312a by closing door 313b, then opening door 313a. After the target is in containment stall 312a, door 313a is closed, then door 313b is opened. The target 30c is then moved into the treatment station 314. Door 313b is closed and the target 30c is irradiated. Once irradiation is complete, door 313d is closed and door 313c is opened, and the target 30c is moved into containment stall 312b. Door 313c is closed and door 313d is then opened, and the target 30c is removed from containment stall 312b and transported by the conveyor system 306 for packaging.

The target 30c is generally rotated during the treatment in order to irradiate the entire external surface 300 of the target 30c. The external beam system 308 generally produces a thin divergent fan beam 316. The fan beam 316, as discussed previously, is produced by periodically varying the current in a sweeping electromagnet 318. The electron beam 28b periodically deflects, or scans, in an arc in response to the periodic change in the magnetic field produced by the focusing electromagnet 318. Due to the number of iterations with which the electron beam 28 scans across the arc, the electron beam 28 appears as a fan, thus the term fan beam.

The fan beam 316 scans across the target 30c as the target 30c rotates. The modulation control system 32 may be used to modulate the electron beam 28b to produce varying sized fan beams 316. In other words, the sweeping electromagnet 318 scans the electron beam 28b in a divergent fan that is sufficiently wide to illuminate the entire target 30c. The modulation control system 32 turns on the electron beam 28b only during a portion of the arc to produce a fan beam 316 having a specific arc length that corresponds to the size of the target 30. Accordingly, the efficiency of the treatment station 26c is increased, and the shielding requirements for the treatment station 26c are decreased.

The internal beam system 310 comprises a beam transport line 320 and a stub probe 332. The beam transport line 320 communicates the electron beam 28a to the stub probe 332. As will be discussed in greater detail below, the stub probe 332 produces a uniform dose of ionizing radiation that emerges from all sides of the stub probe 332. Accordingly, all the internal surfaces 302 of the target 30c are directly irradiated.

In operation, the target 30c is transported into alignment with the fan beam 316 and then rotated about a vertical axis while the fan beam 316 delivers a continuous dose of ionizing radiation. In this manner a uniform dose is delivered to the external surfaces 300 of the target 30c. In the same time period, the internal surfaces 302 of the target 30c are irradiated with the stub tube 332.

Conventional treatment stations do not directly irradiate the internal surfaces 302 of the target 30c. Conventional treatment stations generally irradiate the external surface 300 of the target 30c with an ionizing radiation having sufficient penetrating power to irradiate the internal surfaces 302. Indirectly irradiating the internal surfaces 302 using a high energy ionizing radiation is not as effective at producing a statistical kill of pathogenic bacteria as directly irradiating the internal surfaces 302. Accordingly, the use of the stub probe 332 to treat the internal surfaces 302 of the target 30c reduces the probability that pathogenic bacteria will survive the irradiation process. In addition, because the external surfaces 300 and the internal surfaces 302 of the target 30c are being irradiated, the energy level of the electron beam 28 required to penetrate the target 30c is reduced, which reduces the level of shielding required in the treatment station 26c. Accordingly, the treatment station 26c is dimensionally smaller and less expensive to construct, and can therefor be integrated into large scale food processing operations.

FIG. 7B is a cross sectional schematic drawing of the stub probe 322. The stub probe 322 comprises a housing 324, dispersion optics 328, and scattering elements 330. The housing 324 is generally cylindrical in shape and is fabricated from a low atomic number material, such as aluminum. The electron beam 28a is communicated to the dispersion magnet 328 by the beam transport line 320, which is generally on the longitudinal axis of the housing 324.

The dispersion optics 328 operates to disperse the electron beam 28a. In one embodiment, the dispersion optics 328 comprises a permanent magnet quadrupole disposed on the outer portion of the housing 324. In this embodiment, the permanent magnet quadrupole 329 operates to focus the electron beam 28a in one transverse direction, but defocus the electron beam 28a in the other transverse direction. The degree of defocusing is adjusted so that the electron beam 28a is dispersed over most of the longitudinal length of the housing 324. In another embodiment, the dispersion optics 328 comprises an dipole electromagnet 331 that continually scans the electron beam 28a across the internal surfaces of the housing 324.

The scattering elements 330 are disposed within the housing 324 and are located in the path of the electron beam 28a. The scattering elements 330 interact with the electron beam 28 to scatter the electron beam 28a and can also produce X-rays. In one embodiment, the scattering elements 330 includes a foil 332 having a low atomic number material, such as aluminum, that is located adjacent the dispersion optics 328. In this embodiment, the foil 332 generally allows approximately one-half of the electrons in the electron beam 28a to pass through the foil 232 without interacting with the foil 332. The one-half that pass through the foil 332 interact with the housing 324 along the more distant portion of the stub probe 322 to scatter the electrons and produce X-rays that are deliver dose to the lower half of the internal surfaces 302 of target 30c. The one-half that interact with the foil 332 are scattered into the housing 324 adjacent to the foil 332, and deliver uniform dose to the upper half of the internal surfaces of target 30c.

The scattering elements 330 scatters the electron beam 28 in all directions throughout the entire length of the housing 324, as well as produces X-rays that also scatter in all directions. The result is multiple forms of ionizing radiation that uniformity radiate in all directions from the stub probe 322. Accordingly, all the internal surfaces 302 of the target 30c can be directly irradiated with a controlled dose of ionizing radiation. The modulation control system 32 can be used to control separately the dose that is delivered to the internal surfaces 302 by electron beam 28a and the dose that is delivered to the external surfaces 300 by electron beam 28b, so that the two doses are equal.

Although the present inventions have been described in several embodiments, various changes and modifications may be suggested to one skilled in the art. It is intended that the present inventions encompass such changes and modifications that fall within the scope of the appended claims.

What is claimed is:

1. An electronic pasteurization system operable to irradiate a target with an electron beam, the electronic pasteurization system comprising:
    a modular accelerator having a single accelerator column operable to produce at least one electron beam, wherein each electron beam can be modulated;
    at least one treatment station operable to irradiate the target with the electron beam, wherein each treatment station includes a multilayer shielding system that comprises a first layer operable to absorb substantially all electrons and produce low level X-ray radiation, and a second layer disposed outwardly from the first layer, wherein the second layer operates to absorb substantially all of the low level X-ray radiation; and
    a modular electron beam transport system operable to communicate each electron beam from the modular accelerator to each treatment station, wherein the modular electron beam transport system utilizes permanent magnets to operatively steer the electron beam.

2. The electronic pasteurization system of claim 1, further comprising a feedback modulation control system operable to control the modulation of each electron beam.

3. The electronic pasteurization system of claim 2, wherein the modulation control system comprises a detector system operable to detect a location of the target, and a logic control system operable to receive the location of each target and modulate the electron beam to irradiate only the target with the electron beam.

4. The electronic pasteurization system of claim 1, wherein the target comprises a meat product.

5. An electronic pasteurization system comprising:
    a modular accelerator operable to be scalable in power and to produce at least one electron beam, wherein each electron beam can be modulated;
    an electron beam transport system operable to communicate each electron beam to a treatment station; and
    wherein the treatment station operates to expose a target to the electron beam.

6. The electronic pasteurization system of claim 5, wherein the accelerator comprises a plurality of power assemblies, and each power assembly supplies a stepped-up power to the next successive power assembly.

7. The electronic pasteurization system of claim 5, further comprising a feedback modulation control system operable to control the modulation of each electron beam.

8. The electronic pasteurization system of claim 7, wherein the modulation control system comprises a detector system operable to detect a location of the target, and a logic control system operable to receive the location of each target and modulate the electron beam to expose only the target to the electron beam.

9. The electronic pasteurization system of claim 5, wherein the accelerator is operable to produce a plurality of electron beams.

10. The electronic pasteurization system of claim 5, wherein the treatment station includes a multilayer shielding system comprising a first layer operable to absorb substantially all electrons and produce low level X-ray radiation, and a second layer disposed outwardly from the first layer, wherein the second layer operates to absorb substantially all of the low level X-ray radiation.

11. The electronic pasteurization system of claim 5, wherein the beam transport system comprises a modular beam transport system.

12. The electronic pasteurization system of claim 5, wherein the target comprises a meat product.

13. An electronic pasteurization system comprising:
    an accelerator operable to produce at least one electron beam, the accelerator comprising a plurality of power assemblies, wherein each power assembly supplies a stepped-up power to the next successive power assembly;
    a modular electron beam transport system operable to communicate each electron beam to at least one treatment station, wherein the modular electron beam transport system utilizes a plurality of permanent magnets to operably steer the electron beam; and
    wherein each treatment station operates to expose a target to the electron beam.

14. The electronic pasteurization system of claim 13, further comprising a modulation control system operable to modulate each electron beam.

15. The electronic pasteurization system of claim 13, wherein at least one treatment station includes a multilayer shielding system.

16. The electronic pasteurization system of claim 13, wherein the accelerator includes a single accelerator column.

17. The electronic pasteurization system of claim 13, wherein the target comprises a meat product.

18. An electronic pasteurization system comprising:
    an accelerator operable to produce at least one electron beam;
    at least one treatment station having a multilayer shielding system, wherein the multilayer shielding system comprises a first layer of a relatively low atomic number material operable to absorb substantially all electrons and produce soft X-ray radiation, and a second layer disposed outwardly from the first layer, wherein the second layer operates to absorb substantially all of the soft X-ray radiation; and an electron beam transport system operable to communicate each electron beam to each of the treatment stations.

19. The electronic pasteurization system of claim 18, wherein the first layer comprises aluminum.

20. The electronic pasteurization system of claim 18, wherein the accelerator comprises a modular accelerator.

21. The electronic pasteurization system of claim 18, wherein the accelerator produces a plurality of electron beams.

22. The electronic pasteurization system of claim 18, wherein the electron beam can be modulated.

23. The electronic pasteurization system of claim 18, wherein the beam transport system comprises a modular beam transport system.

24. The electronic pasteurization system of claim 18, wherein the target comprises a meat product.

* * * * *